(12) United States Patent
Wentz

(10) Patent No.: US 11,771,012 B1
(45) Date of Patent: Oct. 3, 2023

(54) BALE PROCESSING SYSTEM

(71) Applicant: Ethen D. Wentz, Menno, SD (US)

(72) Inventor: Ethen D. Wentz, Menno, SD (US)

( * ) Notice: Subject to any disclaimer, the term of this patent is extended or adjusted under 35 U.S.C. 154(b) by 257 days.

(21) Appl. No.: 17/109,585

(22) Filed: Dec. 2, 2020

Related U.S. Application Data

(62) Division of application No. 16/207,596, filed on Dec. 3, 2018, now Pat. No. 11,202,412.

(51) Int. Cl.
*A01F 29/01* (2006.01)
*A01F 29/00* (2006.01)
*A01F 29/12* (2006.01)
*A01F 29/10* (2006.01)
*A01F 29/02* (2006.01)

(52) U.S. Cl.
CPC ............ *A01F 29/005* (2013.01); *A01F 29/01* (2013.01); *A01F 29/02* (2013.01); *A01F 29/10* (2013.01); *A01F 29/12* (2013.01)

(58) Field of Classification Search
CPC ........ A01F 29/005; A01F 29/02; A01F 29/10; A01F 29/01; A01F 29/12; A01D 87/127
See application file for complete search history.

(56) References Cited

U.S. PATENT DOCUMENTS

| | | | | |
|---|---|---|---|---|
| 3,999,674 A | * | 12/1976 | Meitl | A01F 29/005 241/101.76 |
| 4,090,616 A | * | 5/1978 | Runyan | A01D 87/127 414/24.5 |
| 4,195,958 A | * | 4/1980 | Vahlkamp | A01K 5/005 414/812 |
| 4,302,139 A | * | 11/1981 | Malish | A01D 87/127 414/24.5 |
| 4,306,825 A | * | 12/1981 | Yilit | A01D 87/127 414/785 |
| 4,318,653 A | * | 3/1982 | Benefield | A01D 87/127 414/24.5 |
| 4,411,573 A | * | 10/1983 | Townsend | A01F 29/005 241/101.77 |
| 4,412,768 A | * | 11/1983 | Bauer | A01D 87/127 414/24.5 |
| 4,524,916 A | * | 6/1985 | Keyes | B02C 21/02 241/101.76 |
| 4,778,322 A | * | 10/1988 | Stronski | A01F 29/005 414/24.6 |
| 4,830,292 A | * | 5/1989 | Frey | A01F 29/005 241/101.76 |

(Continued)

*Primary Examiner* — Faye Francis
(74) *Attorney, Agent, or Firm* — Jeffrey A. Proehl; Woods, Fuller, Shultz & Smith, PC

(57) ABSTRACT

A bale processing apparatus include a frame, a bale hopper defining a bale chamber for receiving a bale, a bale shredding assembly including a shredding rotor rotatable in a rotor chamber, and a bale movement assembly configured to move a bale in the bale chamber toward the bale feed opening and the shredding rotor. In embodiments, the apparatus may be mountable on support arms of a loader such that the bale processing apparatus is liftable off of the ground surface, and may include a rotor operating assembly may be mounted on the frame and configured to rotate the shredding rotor, and the operating assembly may include an engine fully mounted on the frame such that the frame and the engine may be removed as a unit from the loader. Other embodiments are also disclosed.

17 Claims, 22 Drawing Sheets

(56) References Cited

U.S. PATENT DOCUMENTS

| | | | | |
|---|---|---|---|---|
| 4,996,899 A * | 3/1991 | Henderson | A01D 87/127 | 30/379 |
| 5,067,870 A * | 11/1991 | Staffanson | A01D 87/127 | 414/24.6 |
| 5,106,253 A * | 4/1992 | Wedin | A01D 87/127 | 414/920 |
| 5,150,999 A * | 9/1992 | Dugan | A01D 87/127 | 414/706 |
| 5,333,799 A * | 8/1994 | Posthumus | A01F 29/005 | D15/27 |
| 5,601,241 A * | 2/1997 | Brewster | A01F 29/005 | 241/101.76 |
| 5,603,597 A * | 2/1997 | Clay, Sr. | A01D 87/127 | 224/521 |
| 5,651,653 A * | 7/1997 | Bablo | A01D 87/127 | 414/815 |
| 5,895,001 A * | 4/1999 | Kuelker | A01F 29/005 | 241/101.76 |
| 5,975,444 A * | 11/1999 | Ethier | A01F 29/005 | 241/101.76 |
| 6,045,314 A * | 4/2000 | Greene | A01D 87/127 | 414/24.5 |
| 6,648,254 B2 * | 11/2003 | Hruska | A01F 29/005 | 241/189.1 |
| 6,886,763 B2 * | 5/2005 | Lepage | A01D 87/122 | 241/88.4 |
| 7,377,457 B2 * | 5/2008 | Schierman | A01D 87/127 | 241/101.76 |
| 7,967,231 B2 * | 6/2011 | Post | A01F 29/005 | 241/101.762 |
| 9,027,863 B2 * | 5/2015 | Wentz | A01F 29/005 | 241/189.1 |
| 9,439,360 B2 * | 9/2016 | Wentz | A01F 29/01 | |
| 10,462,976 B2 * | 11/2019 | Sheedy | A01D 87/127 | |
| 11,202,412 B1 * | 12/2021 | Wentz | A01F 29/01 | |
| 2001/0008259 A1 * | 7/2001 | Hruska | A01K 5/002 | 241/189.1 |
| 2002/0074436 A1 * | 6/2002 | Hruska | A01F 29/005 | 241/194 |
| 2002/0106272 A1 * | 8/2002 | Westendorf | A01D 87/127 | 414/685 |
| 2004/0096307 A1 * | 5/2004 | McGinnes | A01D 87/127 | 414/722 |
| 2004/0227025 A1 * | 11/2004 | Lepage | A01F 29/005 | 241/186.2 |
| 2005/0205706 A1 * | 9/2005 | Lepage | A01F 29/09 | 241/30 |
| 2012/0308340 A1 * | 12/2012 | Price | A01D 87/126 | 414/24.5 |
| 2013/0216345 A1 * | 8/2013 | Townsend | A01D 87/127 | 414/703 |
| 2017/0042094 A1 * | 2/2017 | Sargent | A01F 29/08 | |

* cited by examiner

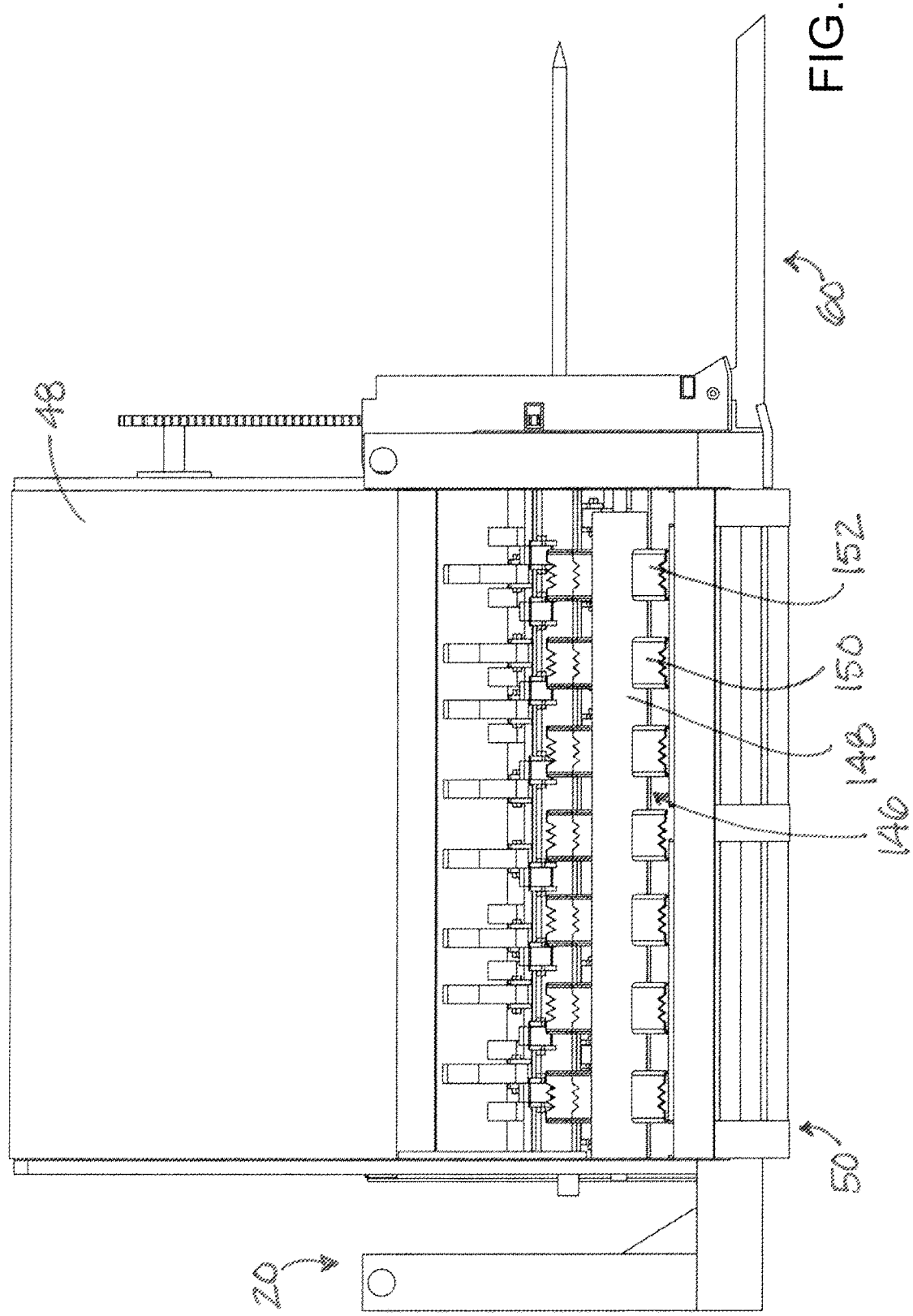

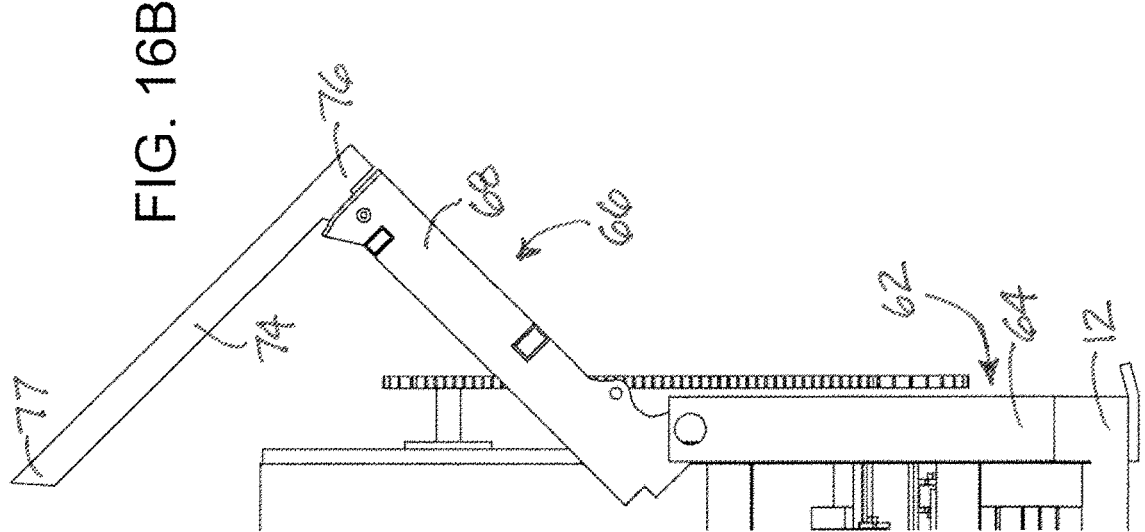
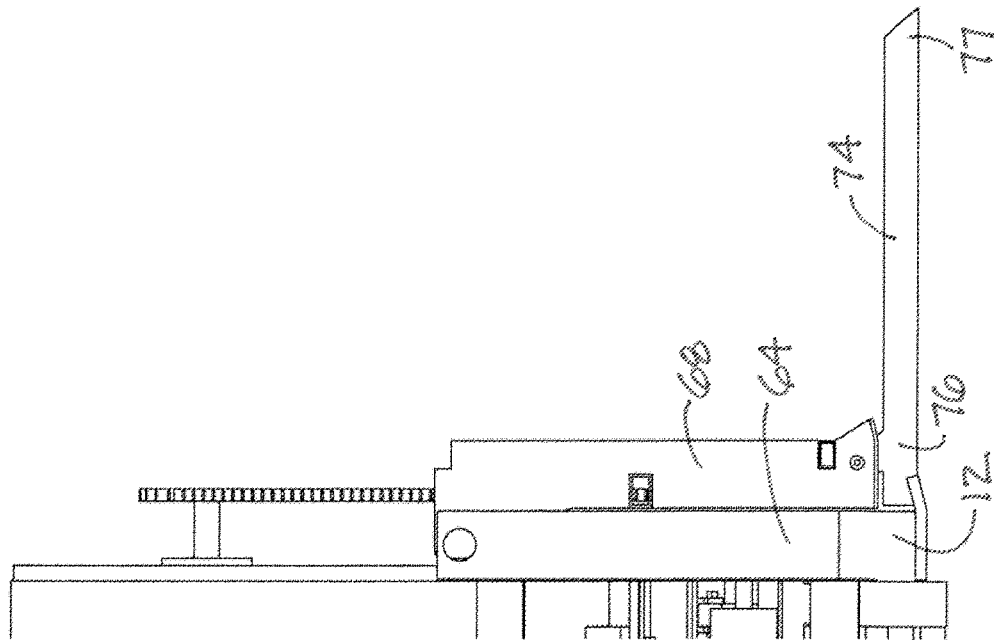

BALE PROCESSING SYSTEM

REFERENCE TO RELATED APPLICATIONS

This application is a divisional of U.S. patent application Ser. No. 16/207,596, filed Dec. 3, 2018, which is hereby incorporated by reference in its entirety.

BACKGROUND

Field

The present disclosure relates to bale handling equipment and more particularly pertains to a new bale processing system for removing material from a bale that has a number of features that enhance the usability and efficiency of operation of the apparatus

SUMMARY

In one aspect, the disclosure relates to a bale processing apparatus mountable on support arms of a loader such that the bale processing apparatus is liftable off of the ground surface, and the bale processing apparatus may include a frame, a bale hopper defining a bale chamber for receiving a bale to be processed, with the bale hopper having an upper opening into the bale chamber, a chamber bottom positioned opposite of the upper opening, and a bale feed opening. The apparatus may also include a bale shredding assembly including a shredding rotor rotatable in a rotor chamber, with the shredding rotor being configured to engage a bale in the bale chamber through the bale feed opening. The apparatus may also include a bale movement assembly configured to move a bale in the bale chamber toward the bale feed opening and the shredding rotor. The apparatus may also include a rotor operating assembly mounted on the frame and configured to rotate the shredding rotor, and the rotator operating assembly may comprise an engine fully mounted on the frame such that the frame and the engine may be removed as a unit from the loader.

In another aspect, the disclosure relates to a bale processing apparatus including a frame, a bale hopper defining a bale chamber for receiving a bale to be processed, with the bale hopper having an upper opening into the bale chamber, a chamber bottom positioned opposite of the upper opening, and a bale feed opening. The apparatus may also include a bale shredding assembly including a shredding rotor rotatable in a rotor chamber, with the shredding rotor being configured to engage a bale in the bale chamber through the bale feed opening. The apparatus may also include a bale movement assembly configured to move a bale in the bale chamber toward the bale feed opening and the shredding rotor. The bale hopper may include a perimeter including a front wall, a rear wall positioned in opposition to the front wall, a side wall extending between the front and rear walls, and a side gate positioned in opposition to the side wall. A bale holding capacity of the bale chamber may be expandable by movement of the side gate from a retracted position to and extended position.

In yet another aspect, the disclosure relates to a bale processing apparatus including a frame, a bale hopper defining a bale chamber for receiving a bale to be processed, with the bale hopper having an upper opening into the bale chamber, a chamber bottom positioned opposite of the upper opening, and a bale feed opening. The apparatus may also include a bale shredding assembly including a shredding rotor rotatable in a rotor chamber, with the shredding rotor being configured to engage a bale in the bale chamber through the bale feed opening. The apparatus may also include a bale movement assembly configured to move a bale in the bale chamber toward the bale feed opening and the shredding rotor. The bale movement assembly may include a plurality of bale rollers configured to rotate a bale positioned in the bale chamber, with all of the bale rollers being positioned to one side of the shredding rotor.

In still another aspect, the disclosure relates to a bale processing apparatus including a frame, a bale hopper defining a bale chamber for receiving a bale to be processed, with the bale hopper having an upper opening into the bale chamber, a chamber bottom positioned opposite of the upper opening, and a bale feed opening. The apparatus may also include a bale shredding assembly including a shredding rotor rotatable in a rotor chamber, with the shredding rotor being configured to engage a bale in the bale chamber through the bale feed opening. The apparatus may also include a bale movement assembly configured to move a bale in the bale chamber toward the bale feed opening and the shredding rotor. The apparatus may also include a bale lift assembly configured to lift a bale into the bale chamber, with the bale lift assembly having a lowered position and a raised position. The bale lift assembly may comprise a bale spear configured to spear a bale located in a stack of bales.

In a further aspect, the disclosure relates to a bale processing apparatus including a frame, a bale hopper defining a bale chamber for receiving a bale to be processed, with the bale hopper having an upper opening into the bale chamber, a chamber bottom positioned opposite of the upper opening, and a bale feed opening. The apparatus may also include a bale shredding assembly including a shredding rotor rotatable in a rotor chamber, with the shredding rotor being configured to engage a bale in the bale chamber through the bale feed opening. The apparatus may also include a bale movement assembly configured to move a bale in the bale chamber toward the bale feed opening and the shredding rotor. The shredding rotor of the bale shredding assembly may include a rotor shaft rotatably mounted on the frame, a plurality of flails mounted on the rotor shaft, and a plurality of hammers mounted on the rotor shaft.

There has thus been outlined, rather broadly, some of the more important elements of the disclosure in order that the detailed description thereof that follows may be better understood, and in order that the present contribution to the art may be better appreciated. There are additional elements of the disclosure that will be described hereinafter and which will form the subject matter of the claims appended hereto.

In this respect, before explaining at least one embodiment or implementation in greater detail, it is to be understood that the scope of the disclosure is not limited in its application to the details of construction and to the arrangements of the components set forth in the following description or illustrated in the drawings. The disclosure is capable of other embodiments and implementations and is thus capable of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present disclosure. It is important, therefore, that the claims be regarded as including such equivalent constructions insofar as they do not depart from the spirit and scope of the present disclosure.

The advantages of the various embodiments of the present disclosure, along with the various features of novelty that characterize the disclosure, are disclosed in the following descriptive matter and accompanying drawings.

BRIEF DESCRIPTION OF THE DRAWINGS

The disclosure will be better understood and when consideration is given to the drawings and the detailed description which follows. Such description makes reference to the annexed drawings wherein:

FIG. 15 is a schematic second side view of the bale processing apparatus with the side gate in the extended position, according to an illustrative embodiment.

FIG. 16A is a schematic side view of the bale lift assembly shown in the lowered position with the pair of forks in place and the bale spear being removed, according to an illustrative embodiment.

FIG. 16B is a schematic side view of the bale lift assembly shown in the raised position with the pair of forks in place and the bale spear being removed, according to an illustrative embodiment.

DETAILED DESCRIPTION

Figure 1:
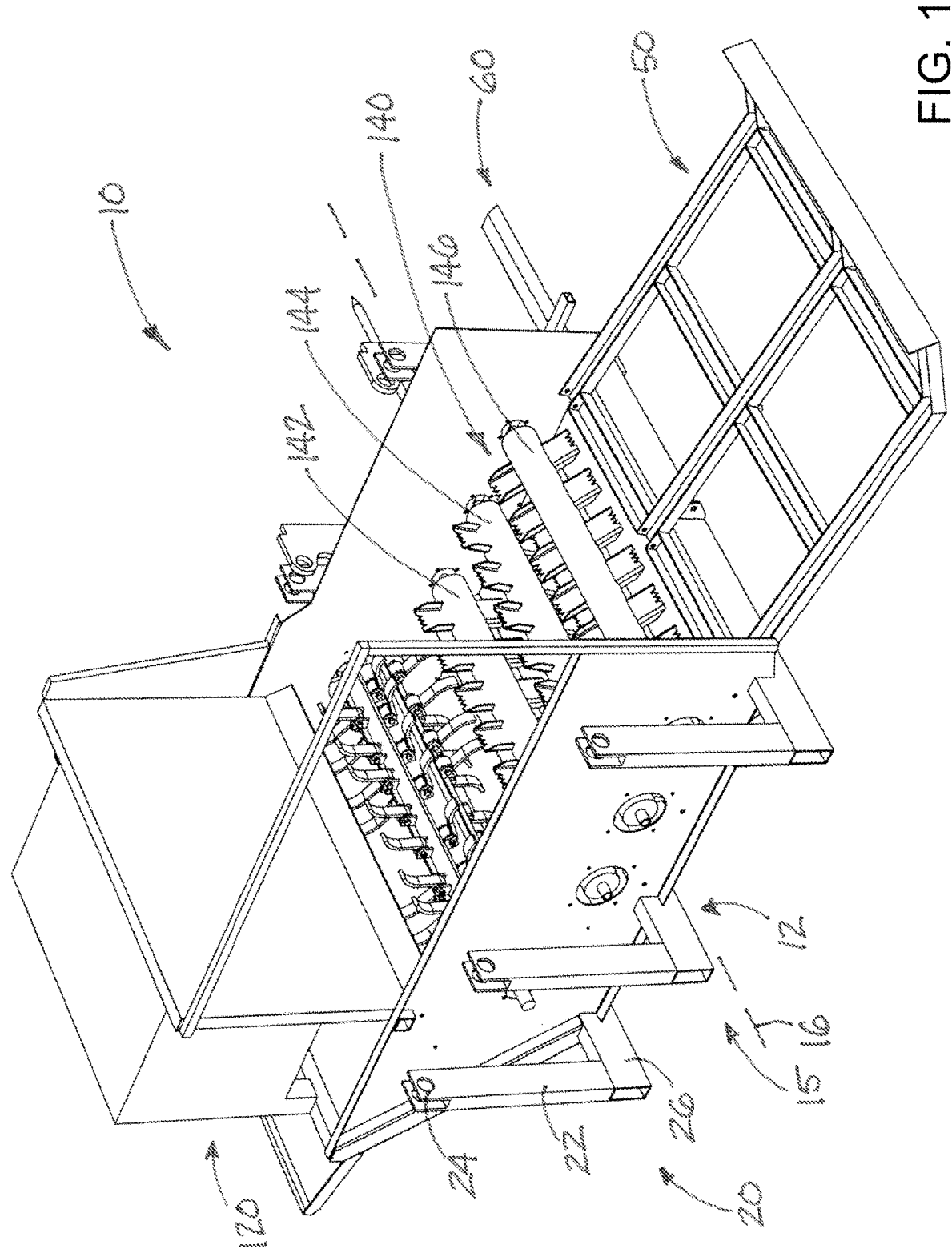
FIG. 1 is a schematic perspective rear view of the bale processing apparatus of a new bale processing system with the side gate shown in the extended position, according to the present disclosure.
Figure 2:
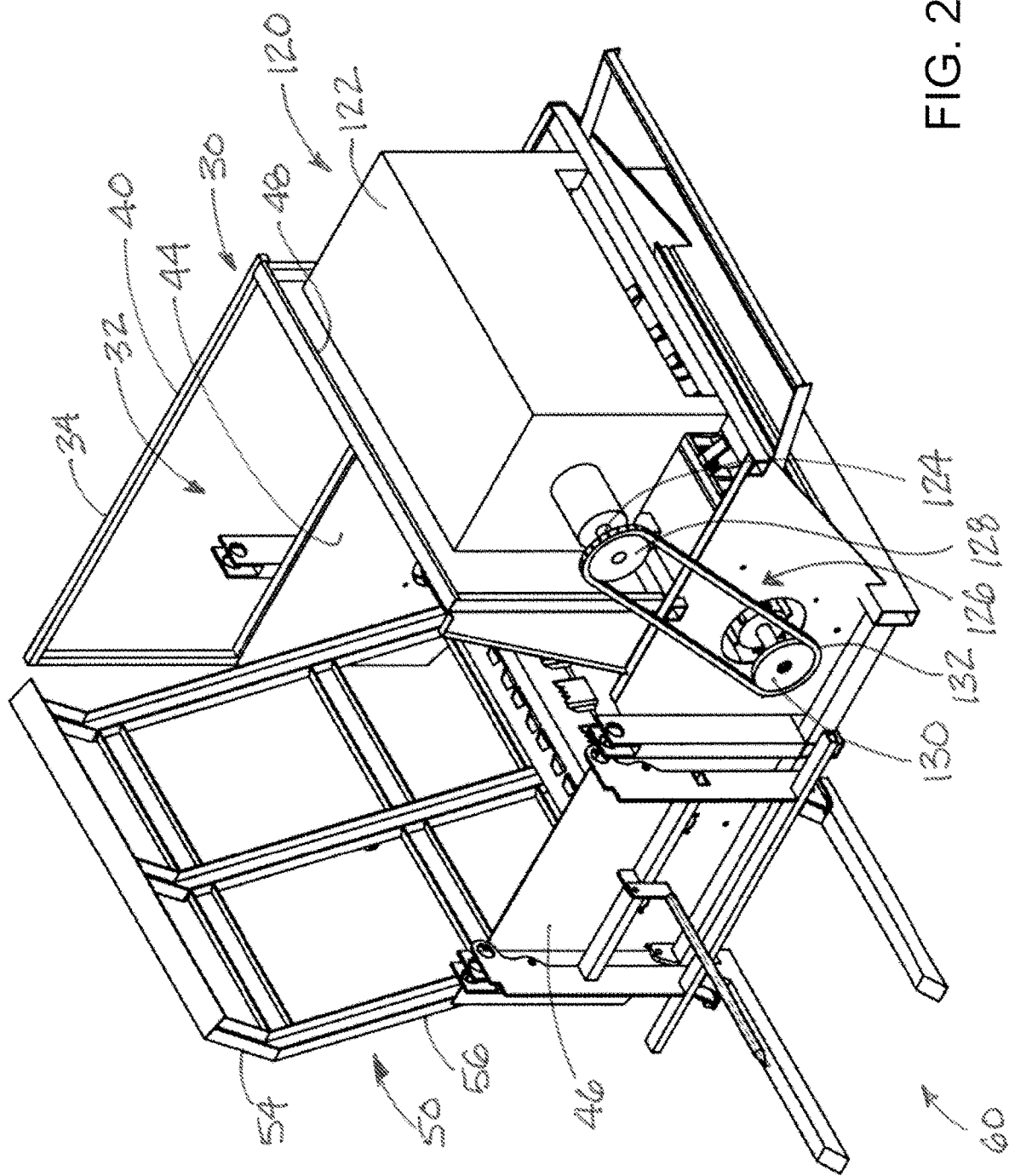
FIG. 2 is a schematic perspective front view of the bale processing apparatus with the side gate shown in the retracted position, according to the present disclosure.
Figure 3:
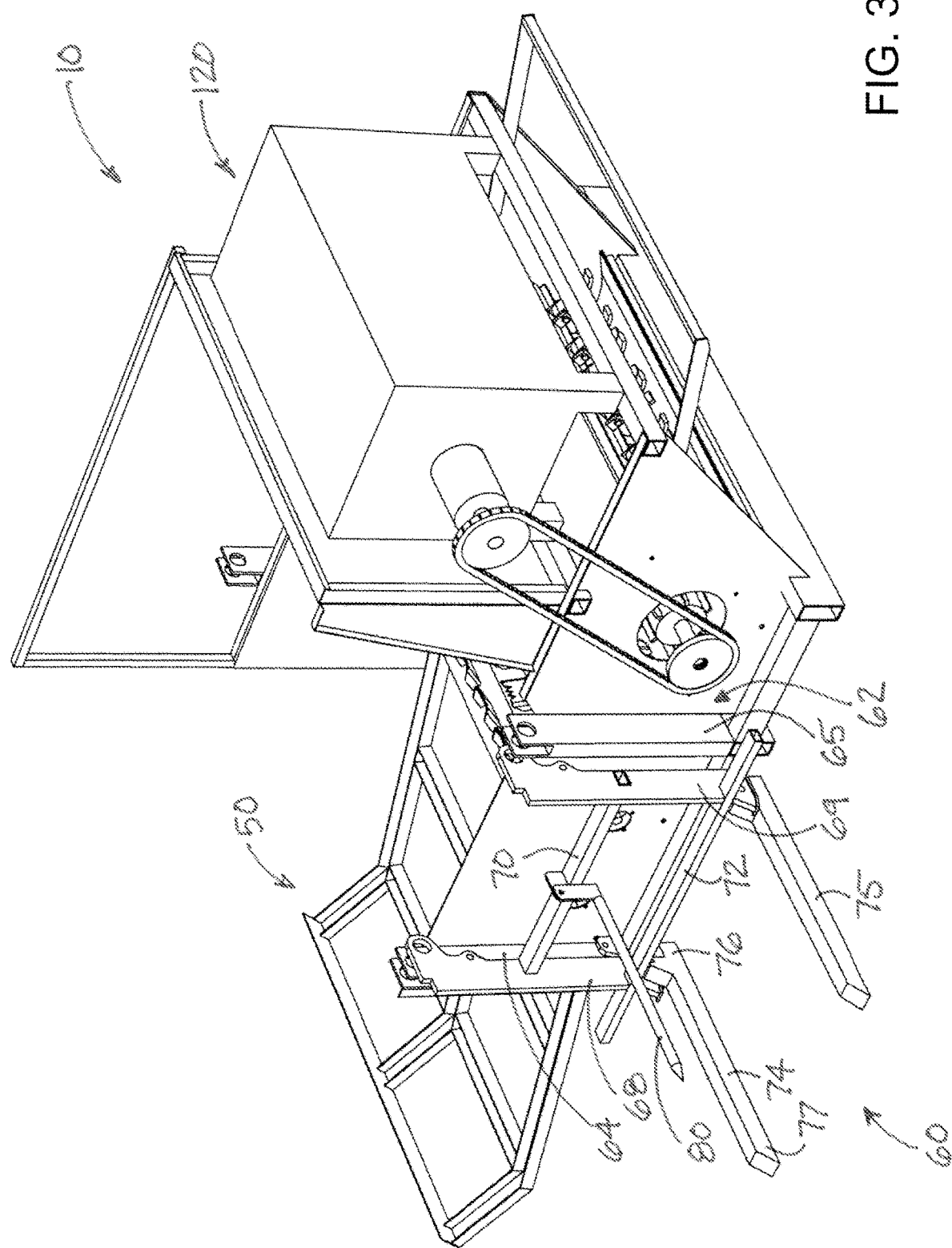
FIG. 3 is a schematic perspective front view of the bale processing apparatus with the side gate shown in the extended position, according to the present disclosure.
Figure 4:
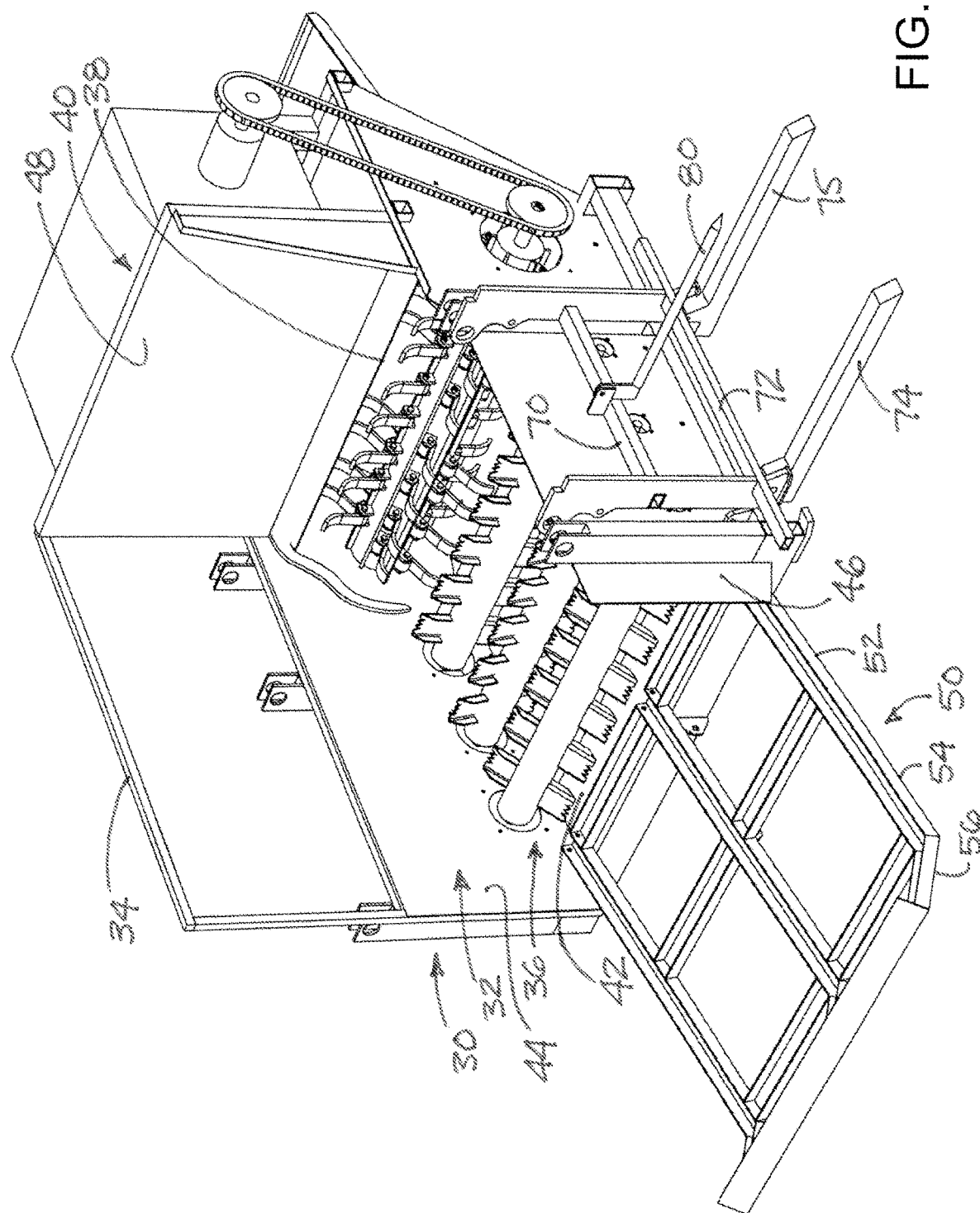
FIG. 4 is a schematic perspective side view of the bale processing apparatus with the side gate shown in the extended position, according to an illustrative embodiment.
Figure 5:
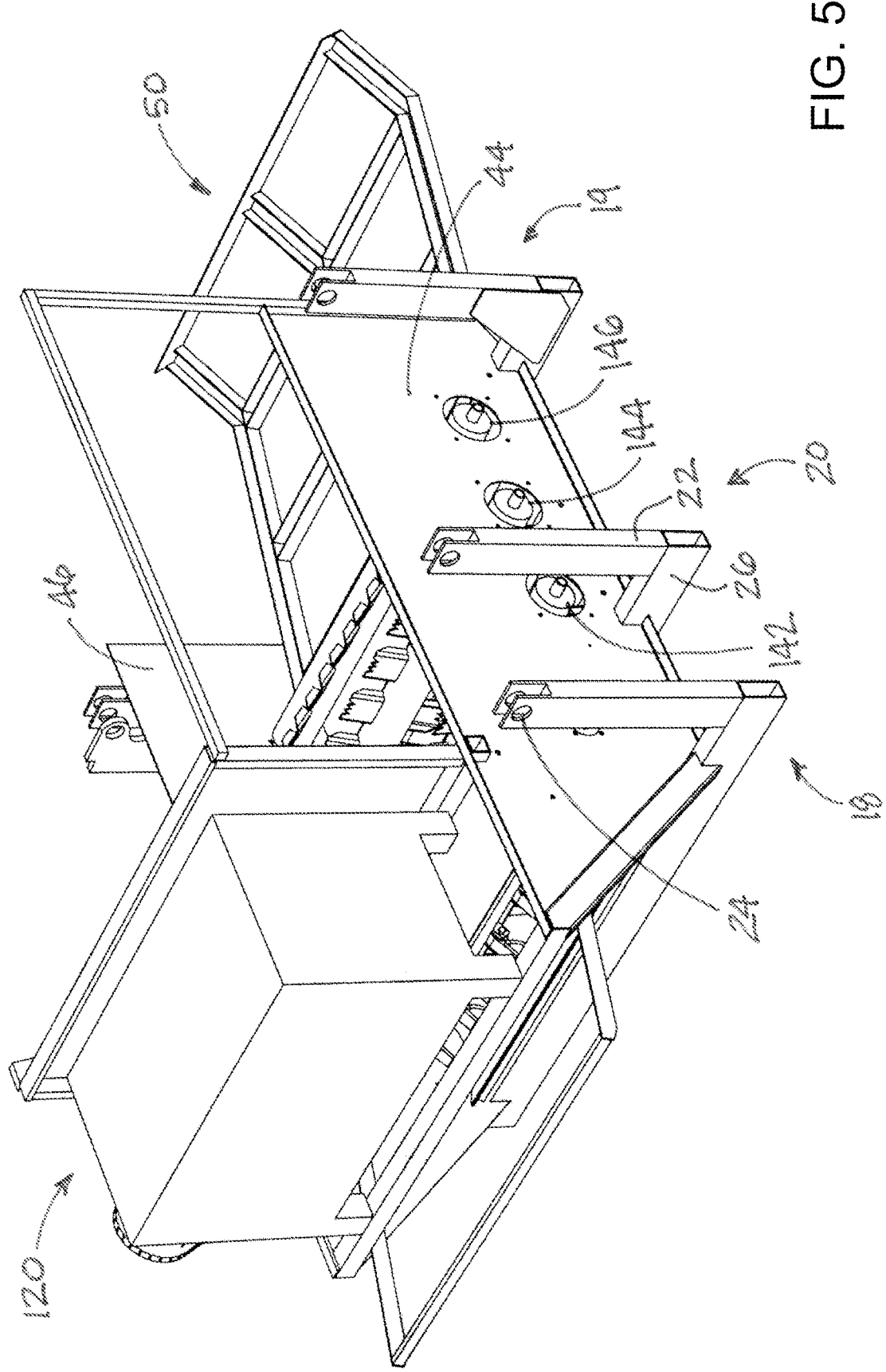
FIG. 5 is a schematic perspective rear view of the bale processing apparatus with the side gate shown in the extended position, according to an illustrative embodiment.
Figure 6:
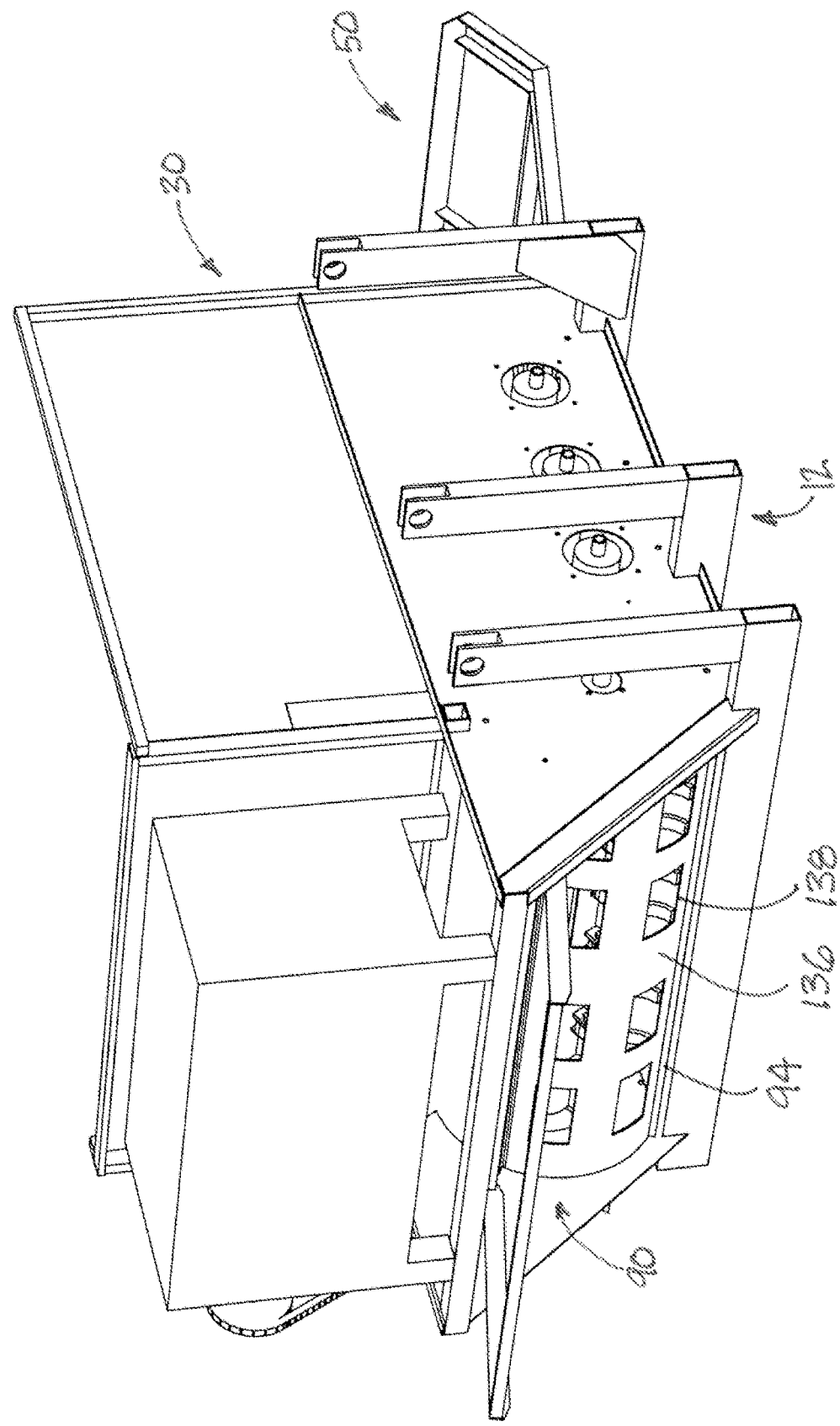
FIG. 6 is a schematic perspective rear view of the bale processing apparatus with a screen panel in position over the bale dispensing opening, according to an illustrative embodiment.
Figure 7:
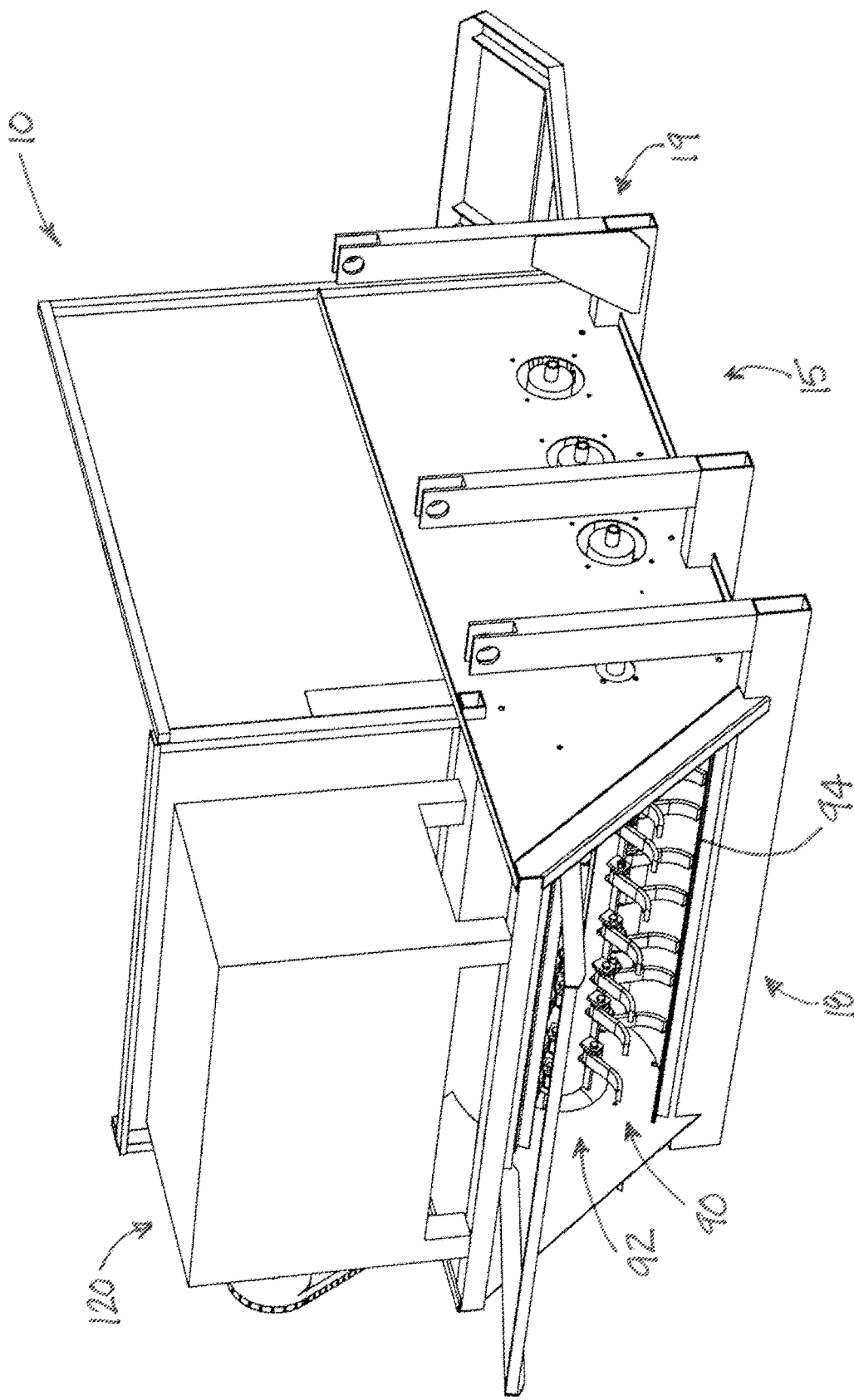
FIG. 7 is a schematic perspective front view of the bale processing apparatus with the screen panel removed from the bale dispensing opening, according to an illustrative embodiment.
Figure 8:
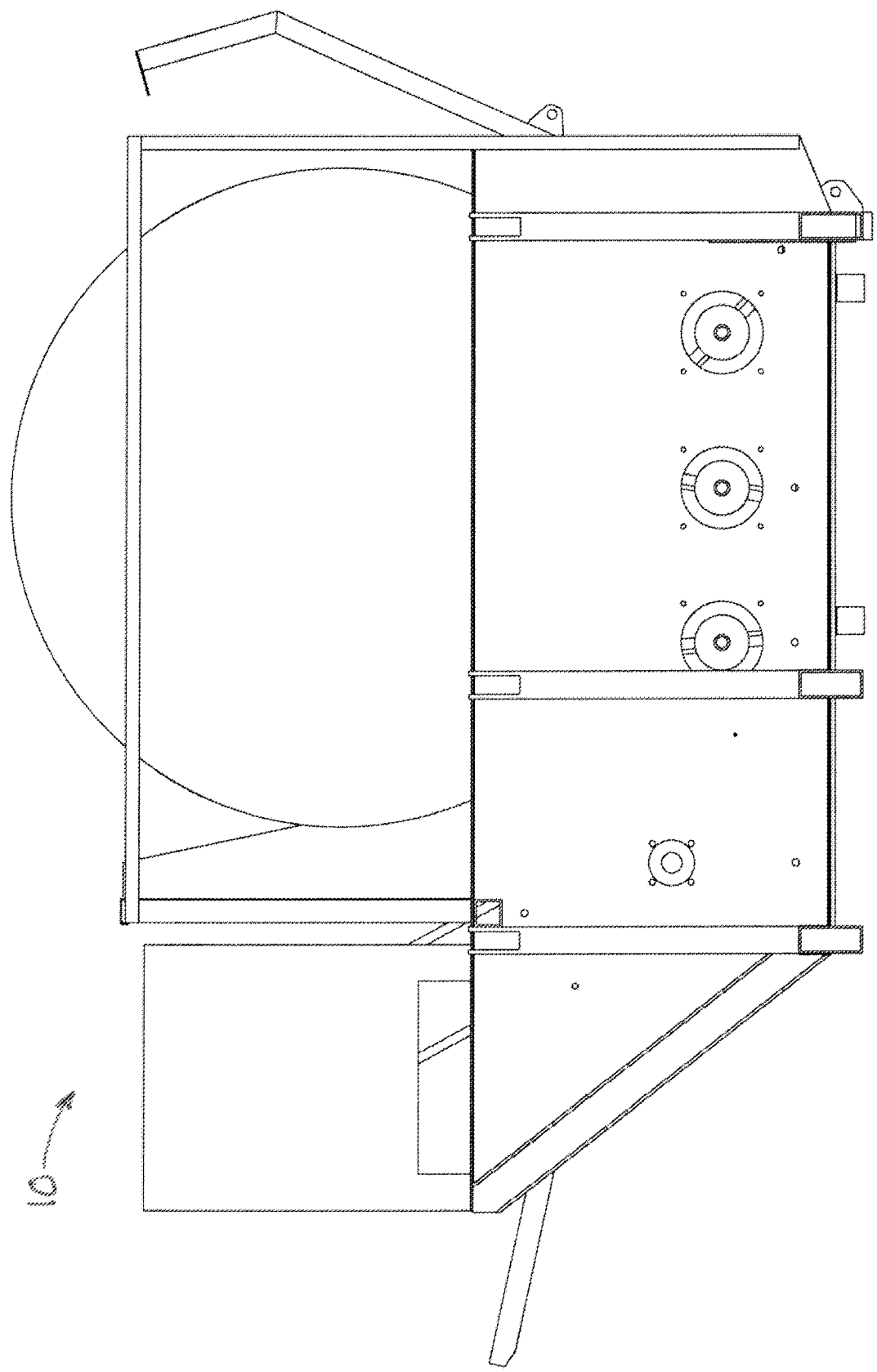
FIG. 8 is a schematic rear view of the bale processing apparatus in which the apparatus is configured to hold a single bale in the bale chamber with the side gate shown in the retracted position, according to an illustrative embodiment.
Figure 9:
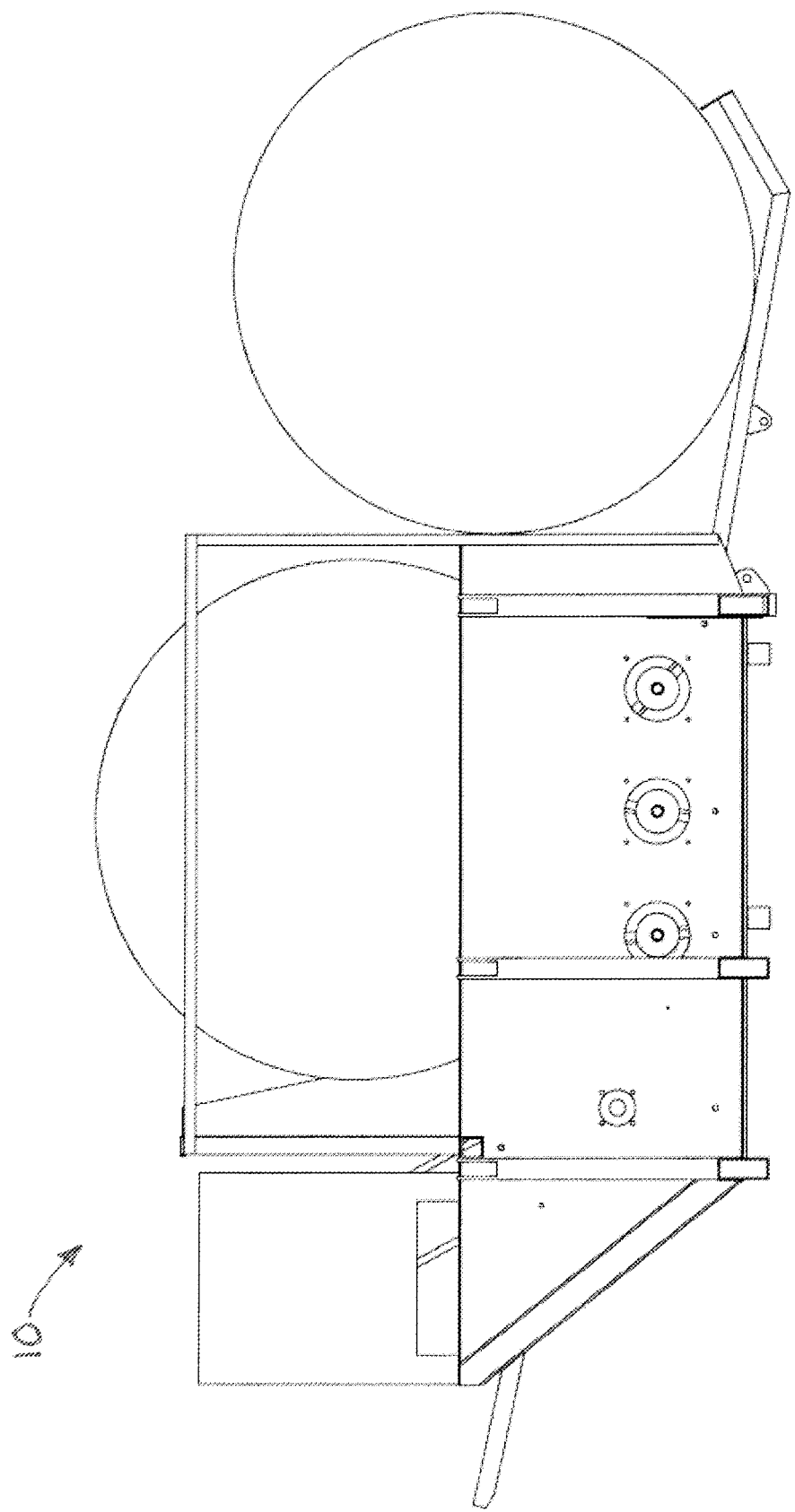
FIG. 9 is a schematic rear view of the bale processing apparatus in which the apparatus is configured to hold two bales in the bale chamber with the side gate shown in the extended position, according to an illustrative embodiment.
Figure 10:
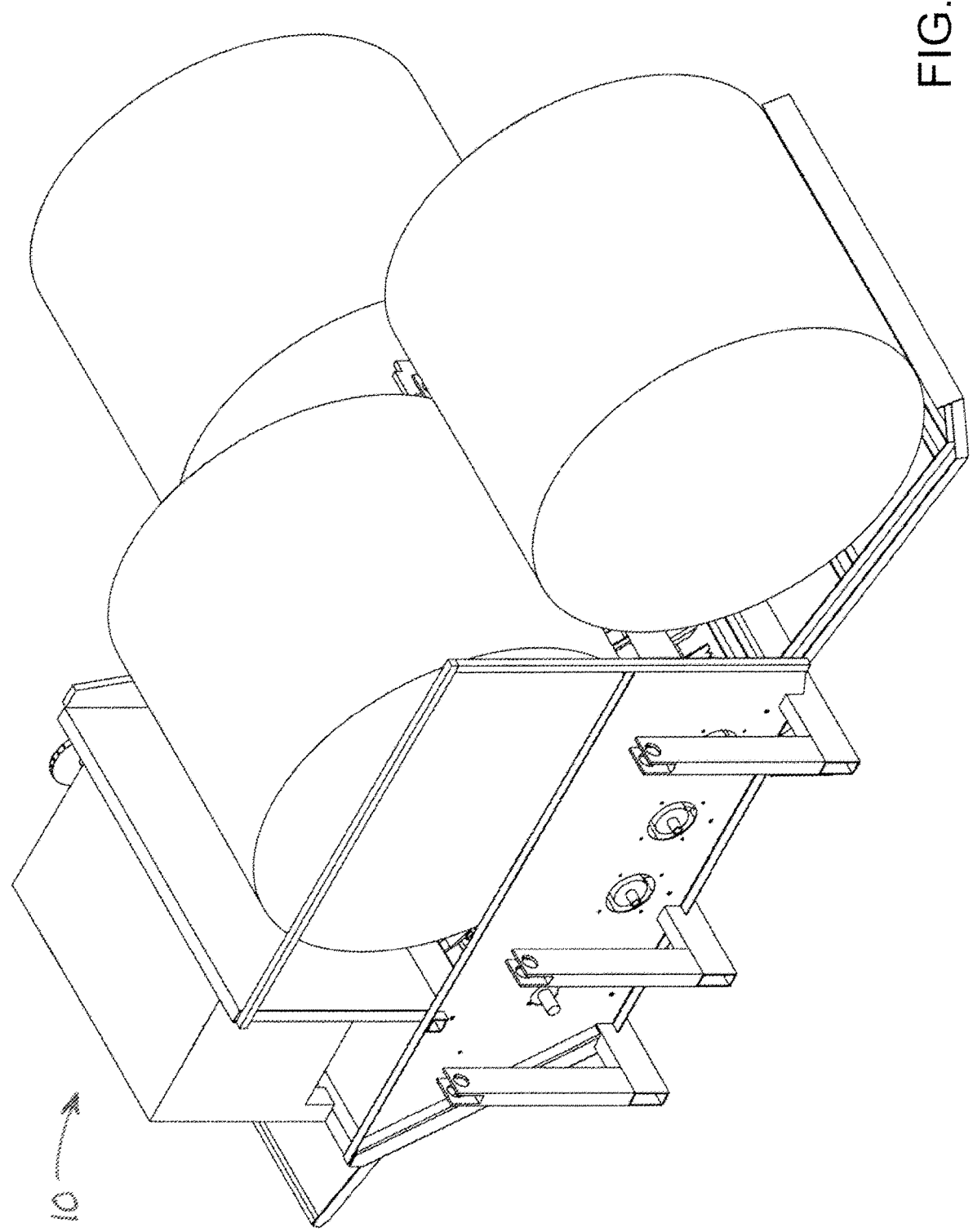
FIG. 10 is a schematic perspective rear view of the bale processing apparatus in which the apparatus configured to hold three bales with two bales being held in the extended bale chamber and one bale being held by the bale lift assembly, according to an illustrative embodiment.
Figure 11:
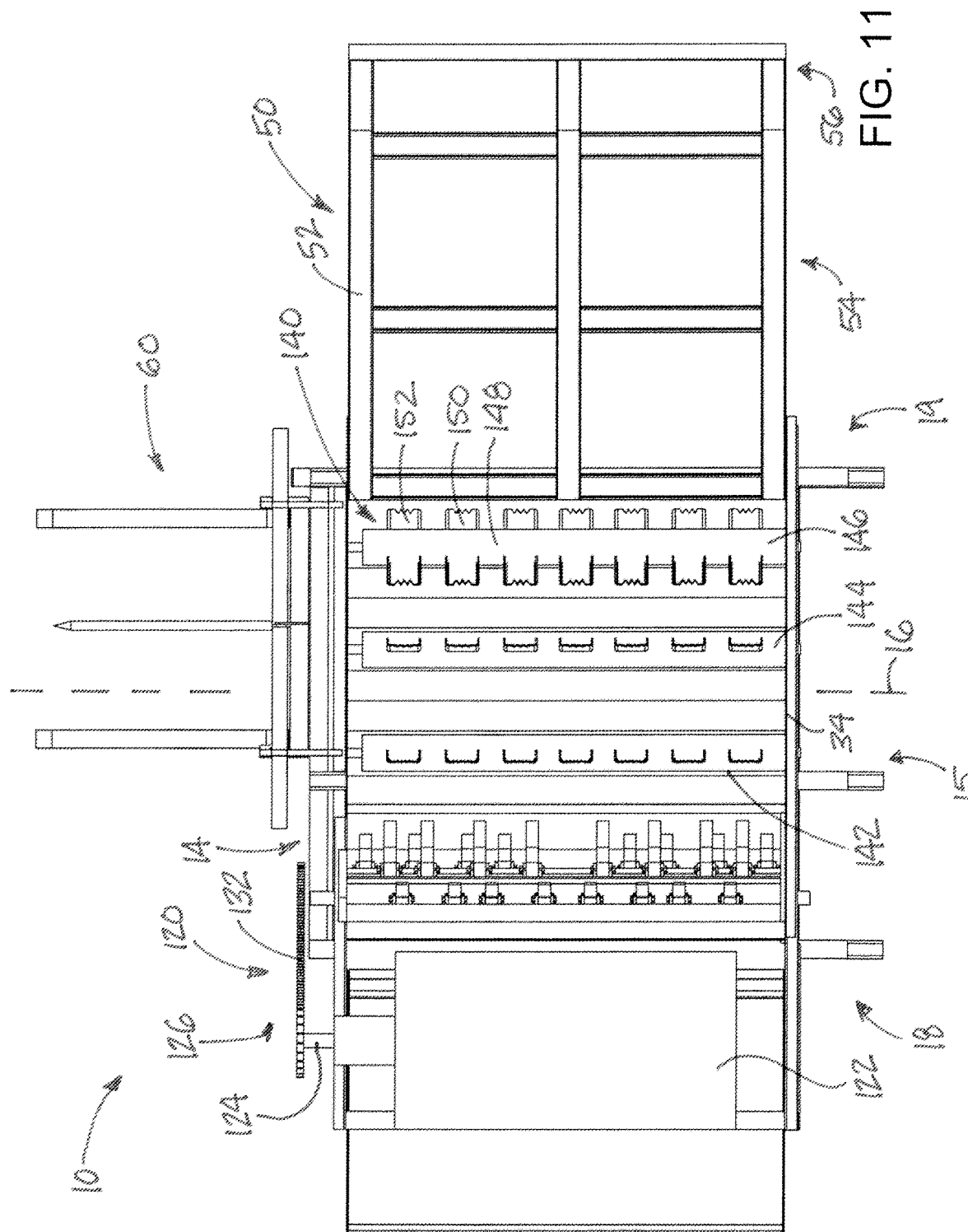
FIG. 11 is a schematic top view of the bale processing apparatus with the side gate being shown in the extended position, according to an illustrative embodiment.
Figure 12:
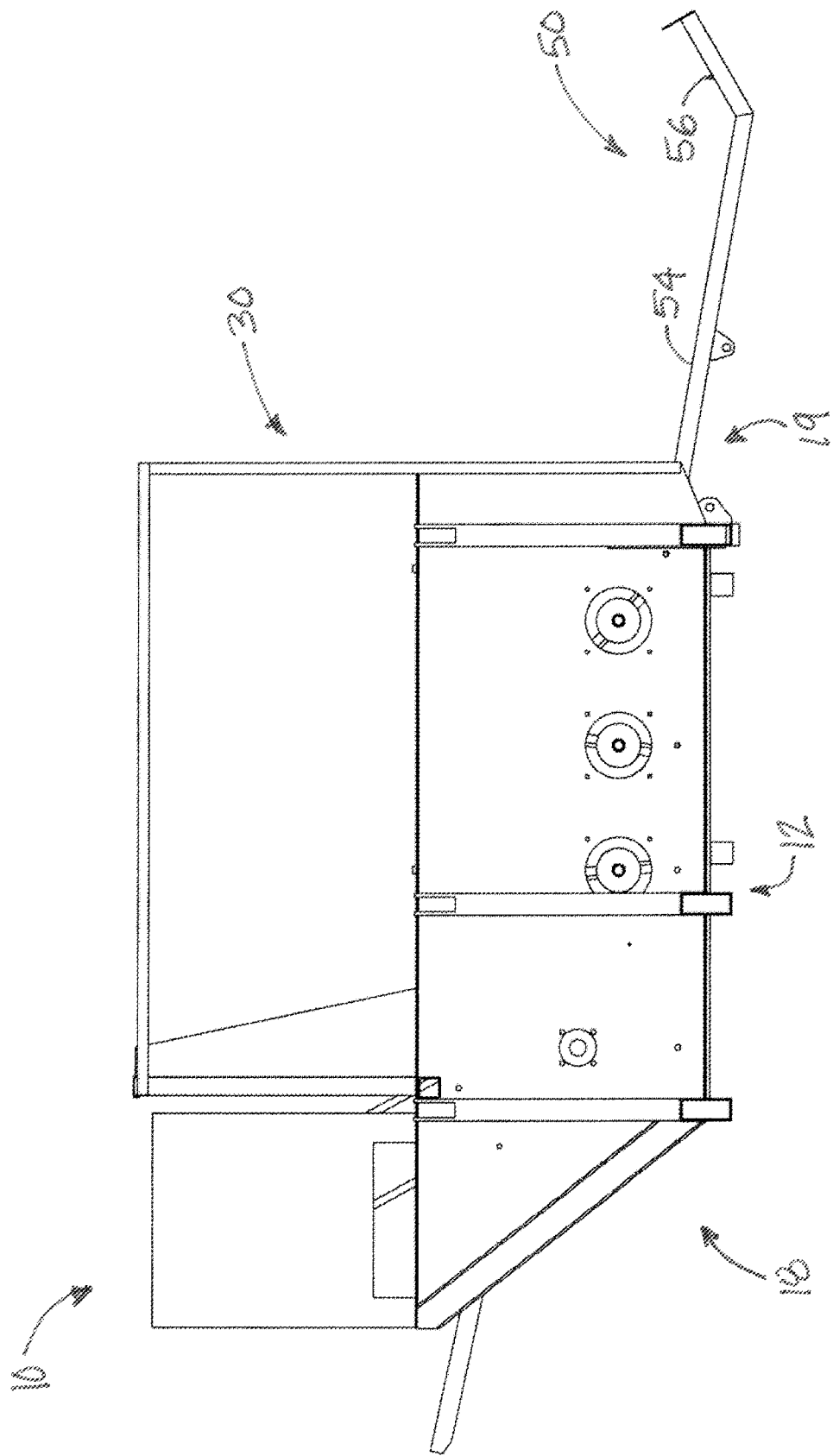
FIG. 12 is a schematic rear view of the bale processing apparatus with the side gate being shown in the extended position, according to an illustrative embodiment.
Figure 13:
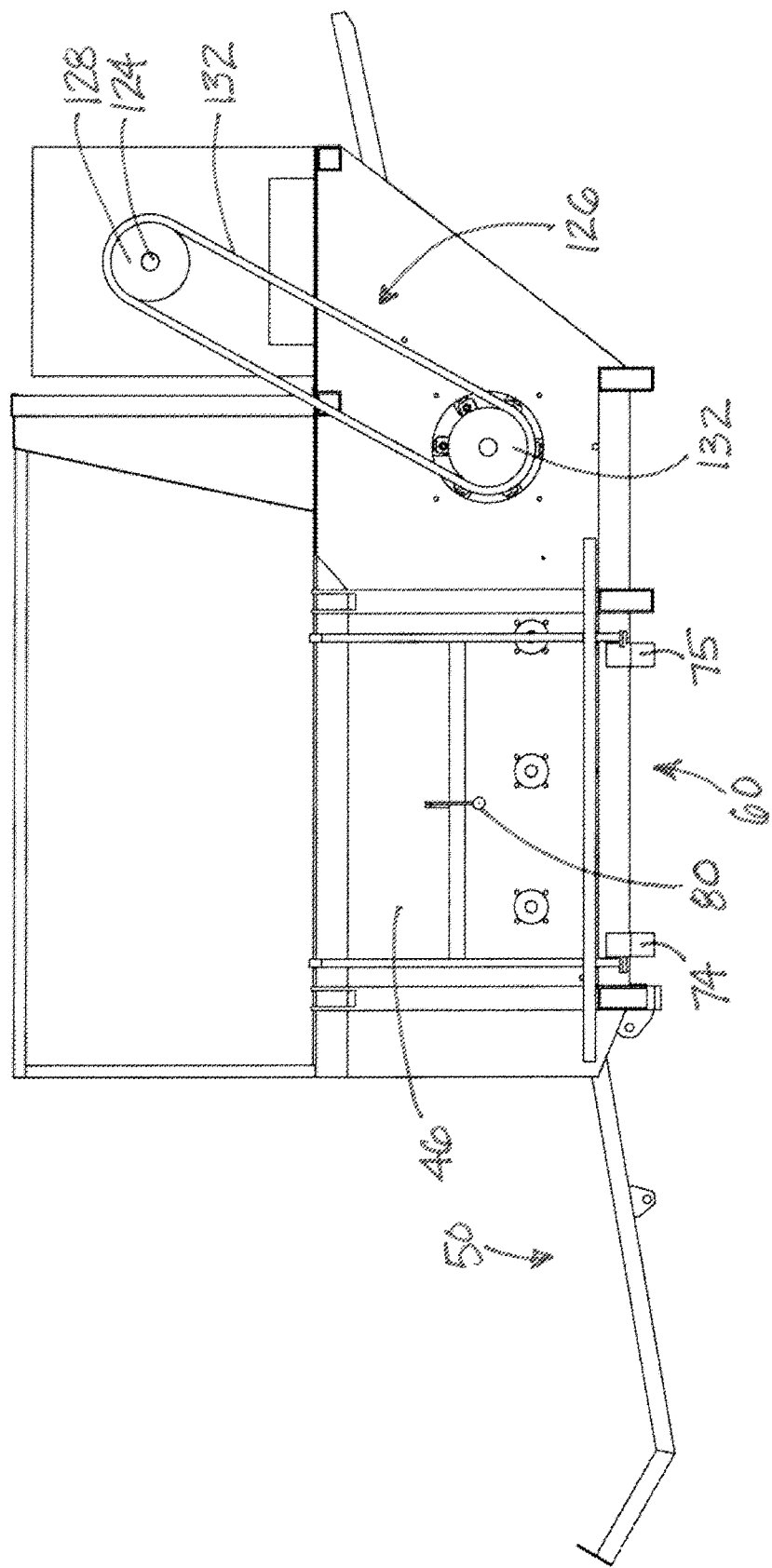
FIG. 13 is a schematic front view of the bale processing apparatus with the side gate being shown in the extended position, according to an illustrative embodiment.
Figure 14:
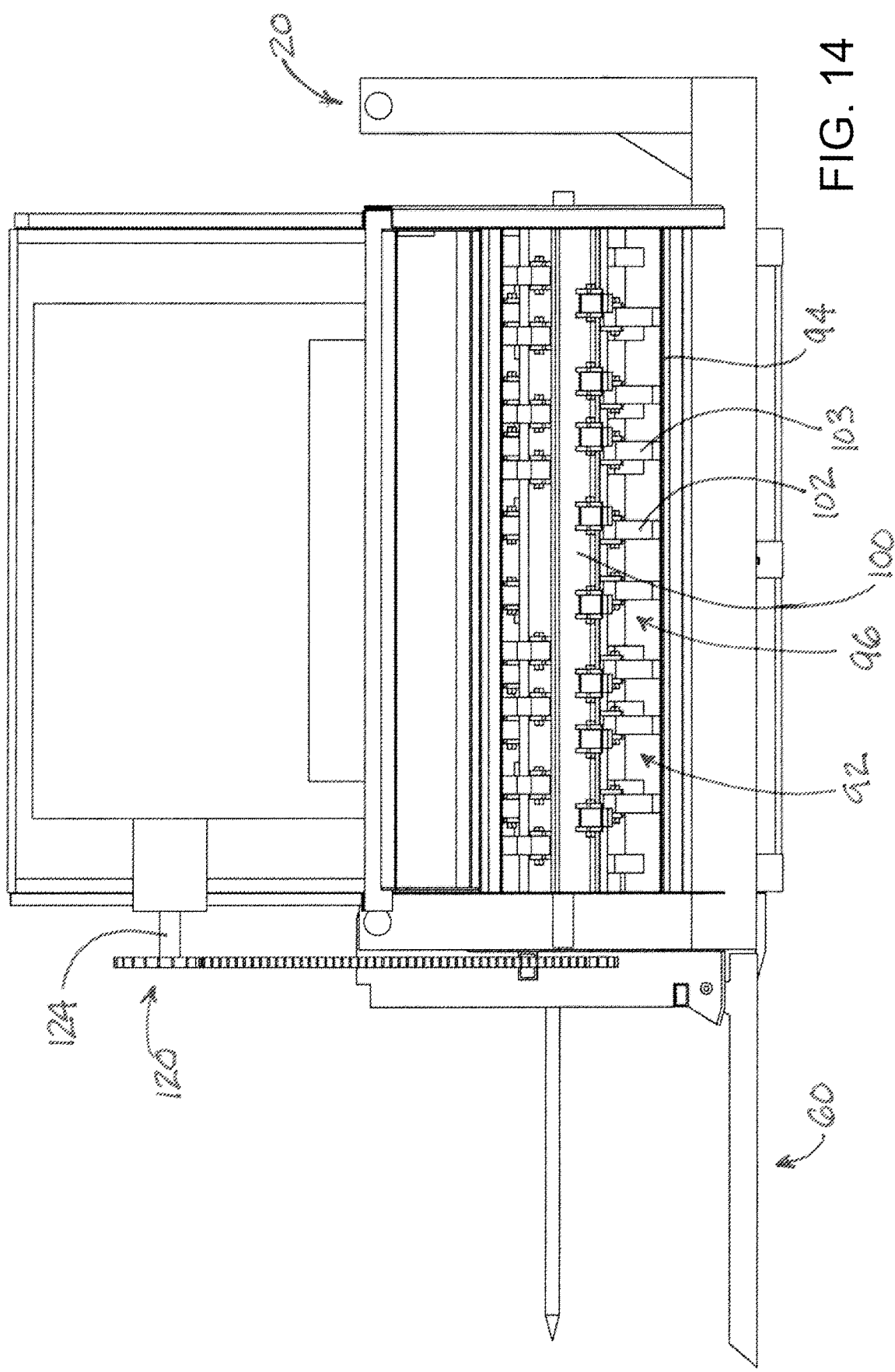
FIG. 14 is a schematic first side view of the bale processing apparatus, according to an illustrative embodiment.
Figure 17B:
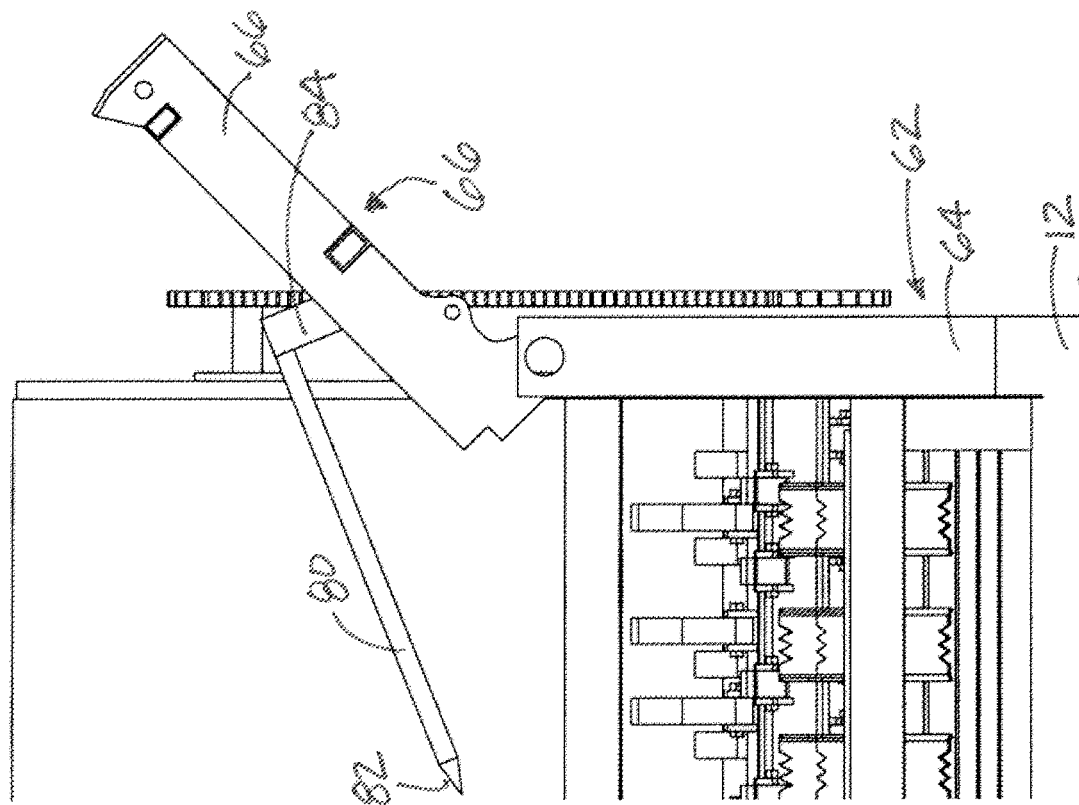
FIG. 17B is a schematic side view of the bale lift assembly shown in the raised position with the bale spear in place and in the release position, with the pair of forks being removed, according to an illustrative embodiment.
Figure 17A:
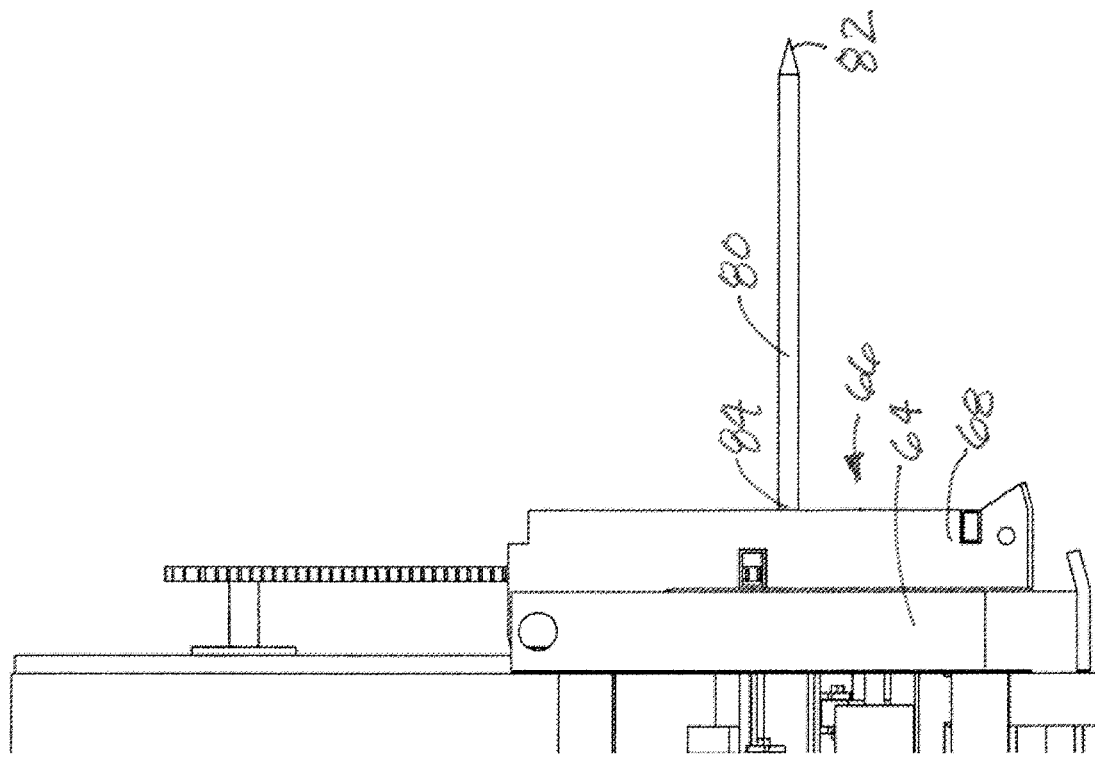
FIG. 17A is a schematic side view of the bale lift assembly shown in the lowered position with the bale spear in place and in the spearing position, with the pair of forks being removed, according to an illustrative embodiment.
Figure 19:
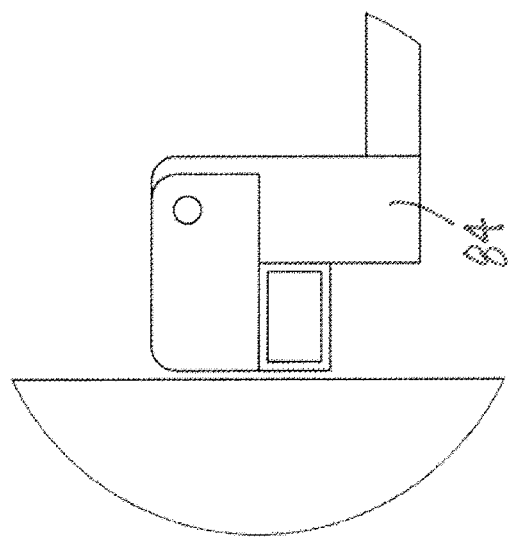
FIG. 19 is a schematic enlarged view of the circled area in FIG. 18 showing detail of the base end of the bale spear, according to an illustrative embodiment.
Figure 18:
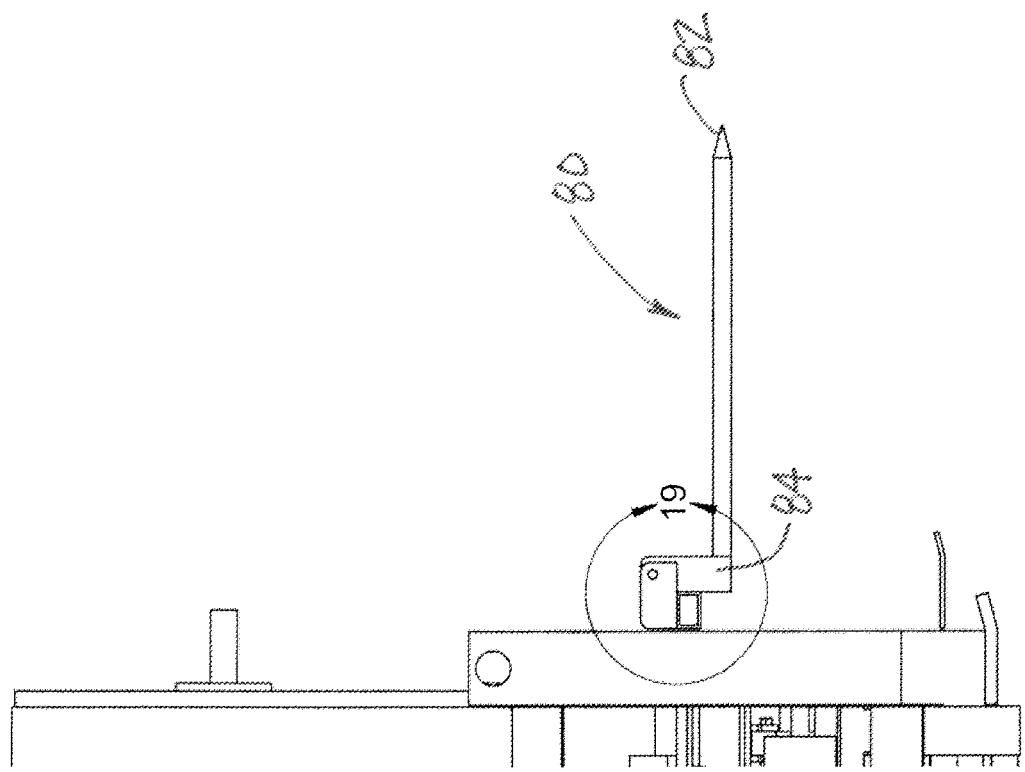
FIG. 18 is a schematic side view of the bale lift assembly with the bale spear in place and the pair of forks removed, according to an illustrative embodiment.
Figure 20:
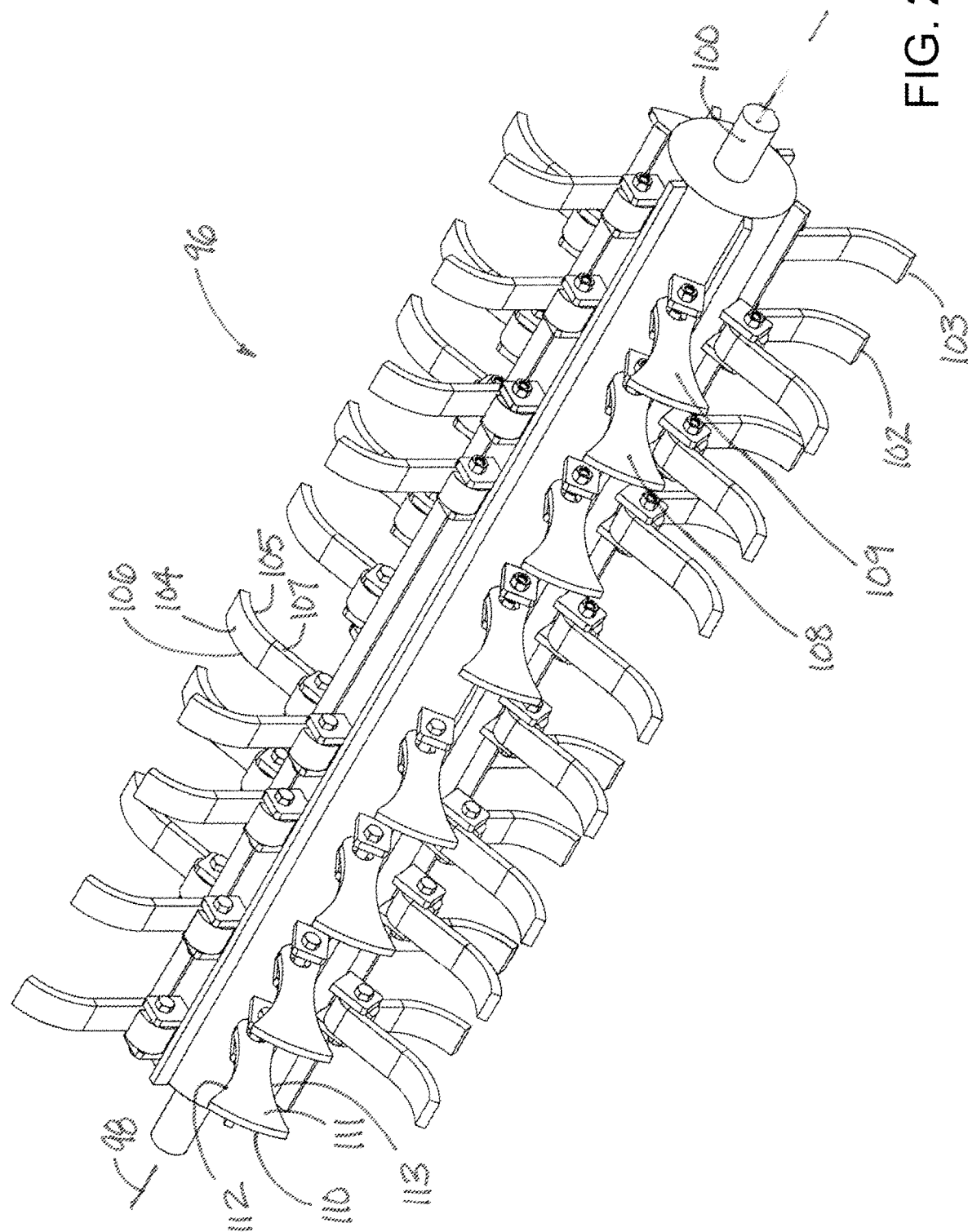
FIG. 20 is a schematic perspective view of the shredding rotor isolated from other elements of the bale processing apparatus and shown with a plurality of flails and hammers, according to an illustrative embodiment.
Figure 21:
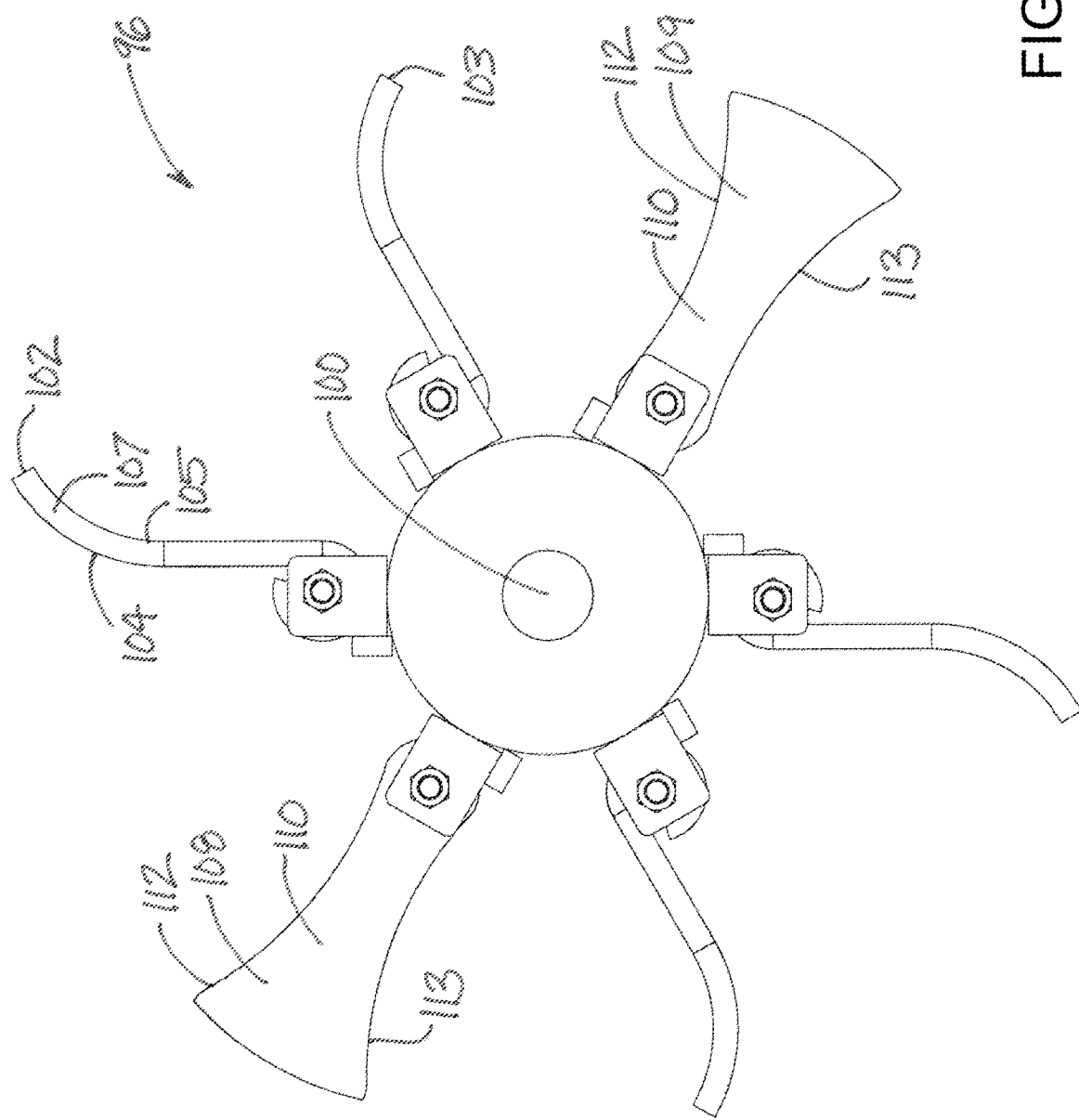
FIG. 21 is a schematic end view of the shredding rotor of FIG. 20 shown isolated from other elements of the bale processing apparatus, according to an illustrative embodiment.
Figure 22:
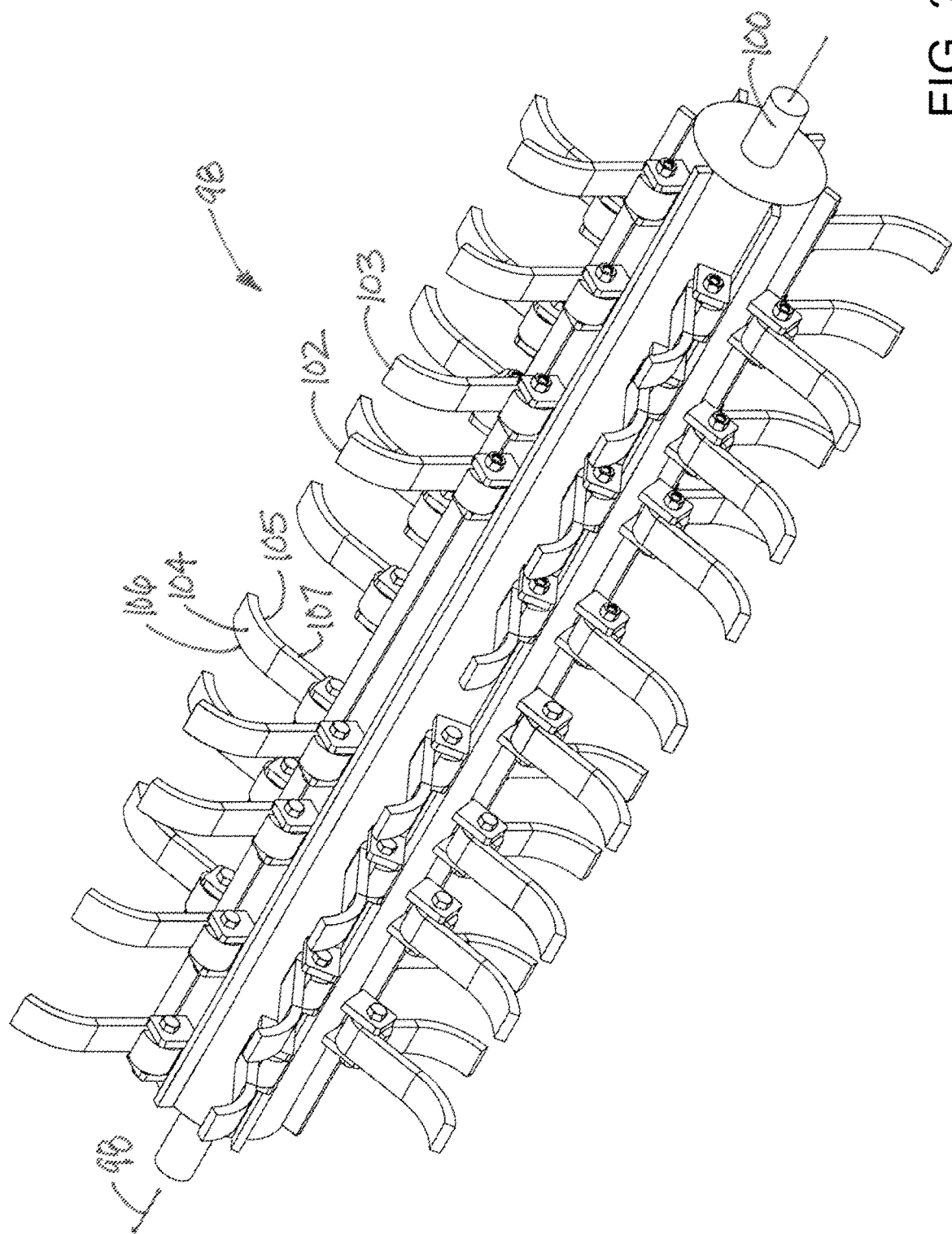
FIG. 22 is a schematic perspective view of the shredding rotor isolated from other elements of the bale processing apparatus and shown with a plurality of flails, according to an illustrative embodiment.
Figure 23:
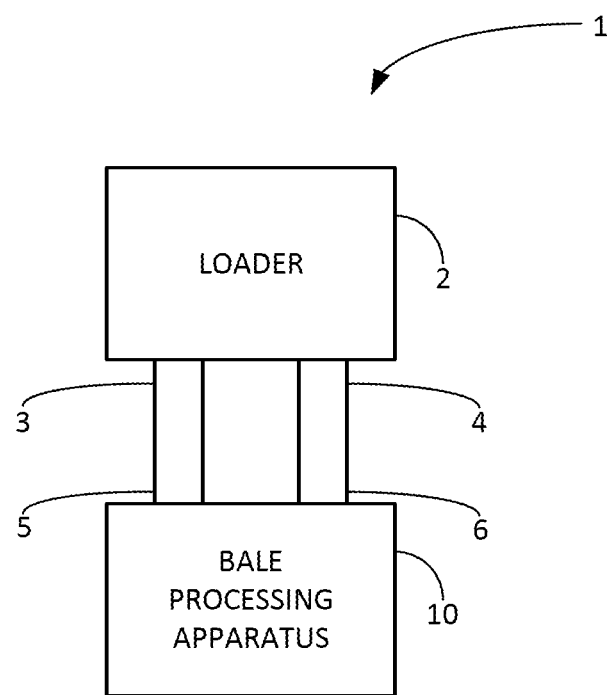
FIG. 23 is a schematic diagram of the new bale processing system, according to an illustrative embodiment.

With reference now to the drawings, and in particular to FIGS. 1 through 23 thereof, a new bale processing system embodying the principles and concepts of the disclosed subject matter will be described.

The applicant has recognized that conventional bale processing apparatus used to shred and grind baled materials tend to have some drawbacks and disadvantages. For example, bale shredders and grinders tend to be limited to apparatus which are towed or trailed behind another vehicle and, while this is not necessarily disadvantageous, a towed or trailed apparatus may have difficulty in adequately free casting or flinging the shredded material in a manner suitable for using the material as feed or bedding for livestock. The applicant has recognized that some primary advantages of loader-mounted bale processing apparatus are the speed and versatility of usage as compared, for example, to trailed processing apparatus. Trailed units may be cumbersome to maneuver in places with limited space to maneuver, and the need to back up to a bale for loading can be difficult and slow for those with lesser trailer backing skills. Such maneuvers can typically be performed by a loader-mounted apparatus much more quickly and with less skill than by a trailed unit. The applicant has also recognized that other advantages result from the ability of a loader to raise a loader-mounted bale processing apparatus into an elevated condition above the ground surface. For example, a loader may be able to raise the processor apparatus in order to discharge the material over panels and gates without requiring the use of an additional apparatus such as a blower, required for a trailed processing apparatus to be able to perform the same functionality.

While bale processing devices for mounting on loaders have been marketed, so far as is known these devices exclusively rely upon power drawn from the loader through the sharing of the hydraulic power of the loader with the processing device. This hydraulic power arrangement inherently greatly limits the amount of power provided to the bale processing device, particularly when the loader systems (e.g., hydraulic actuators) are being utilized to lift and maintain the bale processing device in an elevated condition above the ground surface. The loader-powered systems tend to be limited in their ability to power the bale processing devices to approximately 70 horsepower (approximately 52 kW) or less, power levels which are typically inadequate for grinding the baled materials for stockpiling the materials, and thus such loader-mounted bale processing devices are limited to simply shredding the baled material. Bale processing apparatus with power levels greater than approximately 70 hp are known but are incorporated with a trailer which impairs the ability of the apparatus to free cast and spread the shredded material for use as feed or bedding. Moreover, apparatus with greater horsepower levels tend to be limited to so-called tub grinders which grind the material and require additional apparatus to convey the material.

The applicant has devised a bale processor apparatus that may be loader-mountable and loader-supportable and incorporates a dedicated engine for powering the various elements of the bale processor and does not rely upon auxiliary power provided by the loader in order to operate. The disclosed bale processing apparatus may thus have the functionality and performance capabilities previously limited to trailer-based processing apparatus limited to movement across the ground surface. Through the use of a dedicated engine, the power made available to the bale shredding and grinding elements of the apparatus can be increased to levels of approximately 300 hp (approximately 225 kW) or greater, enabling the bale processor apparatus to have higher performance that is able to grind the baled materials as well as shredding the material and also facilitates the ability to cast or fling shredded material a distance further than would otherwise be possible with an apparatus relying solely upon hydraulic power supplied by the hydraulic systems of the loader. The new bale processing apparatus also may utilize mechanical means for conveying power to the shredding and grinding elements which provides more efficient power transfer than a hydraulic power transfer. The new bale processing apparatus is thus able to grind material, place the material as feed in bunks or windrows, and open or free cast the material for use as animal bedding.

The applicant has also recognized that while there are bale processors and grinders which utilize screens for grinding baled material, such processors are also limited to being incorporated into a trailer for use on the ground surface. Such processors also require a secondary conveying apparatus to remove or take away the material after it is discharged through the screen, such as an auger, a conveyor belt, or other type of conveyor, and are unable to bypass the screen and secondary conveying apparatus in order to, for example, free cast or spread the material removed from the bale.

The applicant has devised a bale processor apparatus that may have at least two modes of processing the baled material including grinding the material through a screen and shredding the material without the screen. In some utilizations, the processed material may be passed through the screen and dropped out of the apparatus into a feed bunk or a windrow utilizing the maneuverability of the apparatus by the loader on which it is mounted and without requiring a secondary conveying apparatus. Further, in other utilizations the processed material may free or open cast from the apparatus without the screen to spread the material in a manner that is highly suitable for livestock bedding.

The applicant has further recognized that conventional trailer-based bale processors utilize a pivoting bale loading mechanism with forks designed to move along the ground surface to be positioned under a bale as the bale rests upon the ground surface, and the mechanism then lifts the bale into the bale chamber of the apparatus. However, this structure on a trailer-based processor is only capable of picking up bales which are resting on the ground surface, thus requiring another apparatus to bring bales in a stack down to the ground surface before the bale can be lifted by the loading mechanism of the bale processor. This limitation is highly problematic in that efficient storage of bales often calls for stacking the bales in pyramids or other arrangements.

The applicant has devised a bale processing apparatus which may include a bale spear (as well as forks) in order to be able to lift and load bales which are not resting on the ground surface when the apparatus is raised by the loader on which it is mounted to level at which the spear is able to penetrate bales located higher up in a stack. The bale spear allows stacked bales to be directly loaded into the bale chamber of the apparatus, without being returned to the ground first, while the forks provide the ability to lift and load bales already resting upon from the ground surface. Moreover, the bale spear is also highly effective for engaging bales which have settled to the point at which there is little or no gap between an upper and lower bale into which a pair of the forks may be inserted to lift the upper bale from the lower bale, and often damages the lower bale when it is attempted. Such improvements may be utilized in both loader-mounted and trailer-based apparatus.

The applicant has still further recognized that some existing bale processors have the capability to hold and haul more than two bales at one time through lengthening of the frame of the bale processor to accommodate more than one bale. Other apparatus utilize an enlarged bale chamber to accommodate larger elongated rectangular bales. However, enlarged bale chambers are believed to be unsuitable for loader-mounted apparatus, and even when applied to trailer-based bale processing apparatus often make the trailered unit more cumbersome to operate and difficult if not impossible to operate in confined spaces.

The applicant has devised a bale processor apparatus which may have the ability to extend the capacity of the bale chamber for at least one additional bale by moving a side extent of the bale chamber outwardly to create additional capacity as well as moving the side extent inwardly to move an additional bale toward the main area of the bale chamber where the additional bale can be contacted by the shredding and grinding elements of the apparatus. This increased capacity does depend upon an enlarged bale chamber that makes the overall processing apparatus larger and more difficult to utilize. Moreover, in addition to the bales carried in the bale chamber of the apparatus, an additional bale may be carried on the bale spear or forks outside of the bale chamber but available to be loaded into the bale chamber. Again, such improvements may be utilized in both loader-mounted and trailer-based apparatus.

The applicant has also recognized that bale processing systems typically utilize one of three mechanisms for handling or moving a bale in the bale chamber. One approach utilizes a conveyor chain along the bottom of the chamber, another approach utilizes a rotating tub or chamber, and still another approach utilizes rollers along the bottom of the chamber. This last approach positions rollers on both sides of a shredding or grinding rotor for the purpose of rotating the bale on and over the rotor, and the rotor strips away material from the bale as the bale is rotated over the rotor. However, if the bale breaks apart or the baled material becomes loose, which is common, the rollers on either side of the rotor tend to no longer assist each other to roll the entire bale, and the rollers then tend to roll only a small portion of loose material. As this continues, the large mass of baled material tends to form a bridge above the rotor and the material eventually is unreachable by the rotor.

The applicant has devised a bale processing apparatus that may have multiple rollers which are all positioned on one side of the rotor rather than on opposite sides of the rotor, so that the rollers are able to assist each other in moving both round bales as well as loose material toward the rotor. The rollers may be in close proximity to each other so that material moved by one roller is brought around to the next roller (closer to the rotor), which in turn brings the material to the next roller (still closer to the rotor), and is eventually moved close enough to the bale feed opening such that elements of the rotor may engage the material. The processing apparatus is thus able to convey loose or packed material to the rotor.

Additionally, the applicant has recognized that bale processors typically have bale contacting elements for striking and processing the baled material. Insofar as is known, the bale contacting elements on a rotor either comprise flails or hammers depending upon the operation to be performed on the bale material. For example, hammers are employed to strip material from the bale and grind the baled material through a screen, while flails are employed to strip material from the bale and move a sufficient amount of air to propel the stripped material through the apparatus and cast the material over an area adjacent to the apparatus.

The applicant has devised a bale processing apparatus that may employ a rotor that includes only flails for casting the shredded material over an area adjacent to the apparatus during operation, and a rotor that includes a combination of flails and hammers for grinding the shredded material through a screen while effectively moving the material through the apparatus for casting the material.

In some aspects, disclosure relates to a bale processing system 1 which may include a loader 2 or payloader which typically has a pair of support arms 3, 4 which are laterally spaced and raisable and lowerable with respect to the ground surface on which the loader rests. Each of the support arms 3, 4 may have a pivot mount 5, 6 located at the respective ends of the support arms. Suitable actuators on the loader may move the support arms and any attachments attached to the pivot mounts on the support arms to relatively higher and lower vertical levels above the ground surface.

In some aspects, the system 1 may include a bale processing apparatus 10 alone, or in combination with the loader 2. The processing apparatus 10 may be mountable on the loader such that the bale processing apparatus may be lifted off of the ground surface to an elevated condition above the ground surface by the loader. The processing apparatus 10 may be mounted on the pivot mounts 5, 6 of the support arms of the loader such that the movement of the support arms raises or lowers the apparatus, and the mounts may be adjusted so that the apparatus maintains a substantially level orientation with respect to, for example, the ground surface. Thus, the entirety of the bale processing apparatus 10 may be liftable off of the ground surface utilizing the support arms of the loader.

In greater detail, the bale processing apparatus 10 may include a frame 12 which may have a front 14 and a rear 15, with the rear of the frame generally being oriented towards the loader when the apparatus is mounted on the loader for use, and the front being oriented away from the loader. The frame 12 may have a primary axis 16 which extends from the front 14 to the rear 15 of the frame and may be generally aligned with a direction of movement of the loader when the loader is moving forwardly or rearwardly. The frame 12 may also have lateral sides 18, 19 positioned on opposite sides of the primary axis 16. The frame 12 may include at least one mount structure 20, and typically a plurality of mount structures, for mounting the frame on to the loader 2. The spacing of the mount structures with respect to each other may correspond to common spacings between supports arms of different types or manufacturers of loaders. Each of the mount structures 20 may include an upright member 22 with a mount aperture 24 formed on the upright for mounting on the support arms of the loader, such as by suitable pins. Additionally, the frame 12 may also include base members 26 which extend forwardly from the upright members 22.

The bale processing apparatus may also include a bale hopper 30 which is configured to receive a bale to be processed by the apparatus. The bale hopper 30 may define an interior bale chamber 32, and may have an upper opening 34 that leads into the bale chamber, and may have a chamber bottom 36 positioned opposite of the upper opening. The bale hopper 30 may also define a bale feed opening 38 through which the bale may be contacted by the bale shredding assembly and may be moved out of the chamber 32.

The bale hopper 30 may comprise a hopper perimeter 40 and a floor 42 positioned toward a bottom of the bale chamber and from which the perimeter extends generally upward. The perimeter 40 may include a rear wall 44 positioned toward the rear 15 of the frame and which is generally immovable with respect to the frame, and a front wall 46 positioned toward the front 14 of the frame and which is also generally immovable with respect to the frame. The hopper perimeter 40 may also include a side wall 48 which extends generally between the front 46 and rear 44 walls and may be located at the first side 18 of the frame. The side wall 48 may extend upwardly from the bale feed opening 38, and may be generally immovable with respect to the frame 12.

The perimeter 40 of the bale hopper may also include means for extending or expanding the capacity of the bale chamber to hold, for example, more than one bale, and may also permit the bale chamber to be contracted to hold a single bale, without requiring permanent expansion of the perimeter defining the bale chamber. The perimeter 40 may include a side gate 50 which extends upwardly from the chamber bottom 36 and is generally positioned between the front 46 and rear 44 walls of the perimeter 40. The side gate 50 may be positioned opposite of the side wall 48 on an opposite side of the bale chamber 32 from the side wall. Illustratively, the side gate 50 may have a reticulated or fenestrated configuration formed of a plurality of gate members 52, although in other embodiments the side gate may be formed of more continuous panels.

Significantly, the side gate 50 may be movable with respect to the frame 12 to selectively extend or increase the bale holding capacity of the chamber 32, and the side gate 50 may be movable between a retracted position (see, for example, FIGS. 2 and 8) and an extended position (see, for example, FIGS. 1, 3, 4, 9 and 10). The retracted position may be characterized by the side gate being incapable of supporting a bale on the gate in addition to any bale already positioned in the bale chamber. The retracted position may further be characterized by the side gate extending generally upwardly and vertically, and in some embodiments the retracted gate may be oriented substantially parallel to the side wall 48. The extended position may be characterized by the side gate being capable of supporting a bale on the gate such that the capacity of the bale chamber is temporarily increased when the gate is in the extended position by, for example, at least one additional bale. The additional bale may be wholly supported on the gate without the bale resting to any significant degree on other elements forming the bale chamber, such as, for example, the chamber bottom 36. The bale may be rested and supported on the surfaces of the gate that face inwardly into the bale chamber when the gate is in the retracted position, and the gate may be constructed sufficiently sturdy to safely support the additional bale. The extended position may further be characterized by the side gate extending generally horizontally and away from the chamber 32 and in some embodiments the extended gate may be oriented substantially perpendicular to the side wall 48. The side gate 50 may be pivotable with respect to the frame, and may be pivotable about a substantially horizontal axis which may be located toward the chamber bottom 36.

In some embodiments, the side gate 50 may include an inboard portion 54 and an outboard portion 56, with the inboard portion being located closer to the axis about which the side gate pivots and the outboard portion being located relatively further away from the axis than the inboard portion. When the side gate is in the retracted position, the inboard portion 54 may be oriented substantially vertically and may be oriented substantially horizontally when the side gate is in the extended position. The outboard portion 56 may be angled inwardly toward the bale chamber 32 when the side gate is in the retracted position and the outboard portion may be angled upwardly from the inboard portion when the side gate is in the extended position. The angling of the outboard portion with respect to the inboard portion may help to retain a bale in position on the side gate when the side gate is in the extended position (see, for example, FIGS. 9 and 10) and may help retain a bale in the bale chamber when the side gate is in the retracted position (see, for example, FIG. 8). A suitable gate actuator or actuators may be configured to move the side gate between the retracted and extended positions, and the actuator may be connected between the side gate and frame.

The system 1 may also include a bale lift assembly 60 which is configured to lift a bale into the bale chamber 32 for processing. The bale lift assembly 60 may have a lowered position in which portions of the assembly may be located generally adjacent to the ground surface when the bale processing apparatus is lowered to and rested upon the ground surface, and a raised position in which portions of the assembly 60 may be located closer to or adjacent to the bale chamber. The bale lift assembly 60 may be generally located toward the front 14 of the frame at a location that is generally opposite of the loader when the processing apparatus 10 is mounted on the loader. In some embodiments, the bale lift assembly 60 may include a pivot mount 62 which is located on the frame 12, and generally extends upwardly from the frame at a location adjacent to the front wall 46 of the perimeter 40. Illustratively, the pivot mount 62 may include a first pivot support 64 extending upwardly from the frame adjacent to the front wall and a second pivot support 65 which also extends upwardly from the frame adjacent to the front wall. The pivot supports 64, 65 may each be connected to one of the base members 26 of the frame 12.

The bale lift assembly 60 may also include a lift frame 66 which is mounted on the pivot mount 62 and may pivot with respect to the pivot mount. In some embodiments, the lift frame 66 may have a substantially vertical orientation in the lowered position of the lift assembly 60 (see, for example, FIGS. 16A and 17A) and an upwardly rotated orientation in the raised position of the bale lift assembly (see, for example, FIGS. 16B and 17B). Illustratively, the lift frame 66 may include a first lift member 68, a second lift member 69 which may be oriented substantially parallel to the first lift member. The lift frame may also include at least one cross member extending between the first 68 and second 69 lift members, and may include an upper cross member 70 and a lower cross member 72 oriented generally parallel to each other in a horizontal orientation.

The bale lift assembly 60 may also include a pair of forks 74, 75 for engaging a bale located on, for example, the ground surface to lift the bale into the bale chamber 32. The pair of forks may be positioned adjacent to the front wall 46 of the perimeter 40 and extend forwardly from the front wall. The pair of forks may be mounted on the lift frame 66 to pivot with the lift frame, and with respect to the pivot mount 62 and frame 12. The pair of forks may include a first fork 74 and a second fork 75 with each of the forks having an inboard end 76 and an outboard end 77. The inboard ends 76 of the forks may be mounted on the lift frame, with each of the inboard ends being mounted on one of the lift members 68, 69.

The bale lift assembly 60 may also include a bale spear 80 which is configured to spear or impale a bale, such as a bale located in a stack of bales but is not necessarily located on the ground surface. The bale spear 80 may be mounted on the lift frame 66. The bale spear 80 has a spear tip 82 as well as a base end 84 located opposite of the spear tip which may be mounted on the lift frame. The base end 84 may be movably mounted on the lift frame to permit the bale spear 80 to move between a spearing position in which the bale spear is oriented substantially perpendicular to the lift frame (see, for example, FIG. 17A) and a release position in which the bale spear is rotated or pivoted toward an orientation that is generally parallel to the lift frame (see, for example, FIG. 17B), and which may permit the release of the bale into the bale chamber 32 when the bale lift assembly 60 is in the raised position. A lift actuator or actuators may be provided to move the lift frame 66 (as well as the forks and/or bale spear mounted on the lift frame) between the positions corresponding to the lowered and raised positions of the bale assembly, and such actuator action connected to the lift frame and the frame 12.

In some embodiments, the forks 74, 75 may be removably mounted on the lift frame 66 to facilitate use of the bale spear 80 alone, and the bale spear may also be removably mounted on the lift frame to permit use of the forks without the bale spear.

The bale processing apparatus 10 may include a bale shredding assembly 90 which may be configured to shred or grind or otherwise remove baled material from a bale positioned in the bale chamber 32. The bale shredding assembly 90 may include a rotor chamber 92 which may be in communication with the bale chamber through the bale feed opening 38. The rotor chamber 92 may also have a dispensing opening 94 through which material that has been removed from the bale is dispensed. The dispensing opening 94 may be located on the rotor chamber in a location that is substantially opposite of the bale feed opening 38.

The bale shredding assembly 90 may also include a shredding rotor 96 which is positioned in the rotor chamber 92 and may be positioned with respect to the bale chamber 32 so that the rotor is able to contact a bale located in the chamber through the bale feed opening. In some embodiments, at least a portion of the shredding rotor 96 may extend through the bale feed opening into the bale chamber 32. The rotor 96 may be rotatable about a rotation axis 98 which may be substantially horizontal in orientation. The rotor 96 may have opposite ends mounted on the frame 12.

In greater detail, an illustrative shredding rotor 96 may include a rotor shaft 100 which is rotatably mounted on the frame to rotate about the rotation axis 98 in a substantially horizontal orientation. The shredding rotor 96 may also include elements to contact the bale and remove material from the bale. For example, the rotor 96 may include a plurality of flails 102, 103 which are mounted on the shredding rotor shaft and may extend substantially radially outward from the rotor shaft when the rotor 96 is rotated. The flails 102, 103 may be elongated in shape with inner ends that are pivotally mounted on the rotor shaft. Each of the flails 102, 103 may have broad opposite faces 104, 105 and narrow opposite edges 106, 107 with the broad opposite faces of the flails being oriented substantially parallel to the rotation axis 98 to facilitate air movement by the flails during rotation of the shredding rotor as well as propelling the movement of the shredded bale material through the dispensing opening. In some embodiments, at least a portion of the length of the opposite faces of the flails may be arcuate in shape.

Optionally, a plurality of hammers 108 may be mounted on the rotor shaft 100 and may extend substantially radially outwardly from the rotor shaft when the rotor 96 is rotated. The hammers 108 may be elongated with inner ends that are pivotally mounted on the rotor shaft 100. Each of the hammers 108 may have broad opposite faces 110, 111 and narrow opposite edges 112, 113, and the broad opposite faces may be oriented substantially perpendicular to the rotation axis 98 of the shredding rotor to facilitate chopping and grinding of the bale material. Thus, the orientation of the hammers is generally perpendicular to the orientation of the flails. In some embodiments, at least a portion of the length of the opposite edges of the hammers may be arcuate in shape.

In some embodiments, the rotor 96 may include only flails which tends to enhance the air movement produced by the rotor and thus increases the ability of the apparatus to free cast or broadcast the material over a large area of the adjacent ground surface, particularly when the apparatus is raised or elevated above the ground surface by the loader. In some embodiments, the rotor 96 may include a combination of flails and hammers to grind material when the screen panel 136 is in place on the bale dispensing opening 94 and to propel material through the holes in the screen panel over an area of the ground surface adjacent to the apparatus. The flails and the hammers may be arranged in separate longitudinal rows on the rotor shaft 100. In some embodiments, the number of flails on the rotor may equal or exceed the number of hammers, and in embodiments the number of flails on the rotor may be approximately double the number of hammers on the rotor. Illustratively, the rotor may include four rows of flails and two rows of hammers, with paired rows of the flails being separated by a single row of hammers.

A rotor operating assembly 120 may be provided to rotate the shredding rotor and may also be employed to power other systems of the apparatus 10. Significantly, the rotor operating assembly 120 may be mounted on the frame 12 such that the processing apparatus 10 is a substantially self-contained unit with the other elements of the bale processing apparatus 10 and without requiring any power source external to or independent of the apparatus 10, such as, for example a loader to which the apparatus is mounted. The rotor operating assembly 120 may be configured to rotate the shredding rotor independent of any power source not mounted on the frame 12. The processing apparatus 10 may only rely upon the loader for movement (e.g., horizontal and vertical) with respect to the ground surface and not for powering any aspect of the apparatus 10. The rotor operating assembly 120 may include an engine 122 which is configured to rotate the shredding rotor and may be fully mounted on the frame 12 such that the frame and the engine 122 may be moved as a unit. The engine may suitably be an internal combustion engine burning fuel supplied from a fuel tank integrated with the other elements of the bale processing apparatus, but optionally could comprise an electric motor with a suitable level of power as well as suitable battery power integrated with the other elements of the bale processing apparatus.

The rotor operating assembly 120 may also include mechanical structure 126 which mechanically connects the engine to the shredding rotor to transmit rotational motion from the engine to the shredding rotor. The mechanical structure may include a driver pulley 128 which is mounted on an output shaft 124 of the engine, a driven pulley 130 which is mounted on the rotor shaft 100 of the shredding rotor, and a loop member 132 which is looped about the driver pulley and the driven pulley to transmit rotational motion between the driver in driven pulleys. Suitably, the loop member 132 may comprise a chain and the pulleys may comprise sprockets, although other power transmission structures may be utilized such as, for example, belts and pulley systems as well as gears systems. Optionally, but typically less efficiently and effectively, the structure transferring rotational power from the engine to the rotor may comprise a hydraulic pump powered by the engine 122 and a hydraulic motor connected to the rotor shaft with suitable hydraulic conduits connecting the pump and motor.

The bale shredding assembly may also include a screen panel 136 which is removably positionable over the dispensing opening 94 to screen material engaged and moved by the rotor 96 and then moving through the dispensing opening. The screen panel 136 may facilitate a grinding effect on the material removed from a bale. Screen panel may have a plurality of holes 138 through which material is able to be driven by the action of the shredding rotor, and the size of the holes may help control the size of the material pieces ultimately passing through the holes.

The bale processing apparatus 10 may also include a bale movement assembly 140 which is configured to move a bale positioned in the bale chamber 32 toward the shredding rotor 96 so that the shredding rotor (or elements thereof) are able to engage the bale and remove pieces of the baled material from the bale. The bale movement assembly may be positioned at or toward the bottom 36 of the bale chamber such that a bale positioned in the chamber rests upon the elements of the bale movement assembly. In some embodiments, the bale movement assembly 140 may include a plurality of bale rollers 142, 144, 146 which are configured to rotate a bale positioned in the bale chamber toward the bale feed opening 38 in the bale shredding assembly 90. In some preferred embodiments, all of the bale rollers are positioned on one side of the shredding rotor 96 of the bale shredding assembly, and all of the bale rollers are located between the shredding rotor and the side gate 50. The plurality of bale rollers may be positioned toward the chamber bottom and each of the bale rollers being rotatable about a rotation axis which is generally oriented substantially parallel to the rotation axis 98 of the rotor 96. Illustratively, the plurality of bale rollers may include three bale rollers 142, 144, 146. Each of the bale rollers may include a roller shaft 148 which is rotatably mounted on the frame and is elongated with a longitudinal length. A plurality of bale engaging elements, such as claws 150, 152, may be mounted on the roller shaft 148 and extend radially outwardly from the roller shaft. The claws 150, 152 may be positioned along the longitudinal length of the roller shaft at substantially uniform spacings, and may be aligned in two or more rows about the shaft 148. Illustratively, each of the bale rollers may be rotated by a hydraulic motor which may be operated by hydraulic fluid to pressurize by hydraulic pump operatively connected to the engine 122.

It should be appreciated that in the foregoing description and appended claims, that the terms "substantially" and "approximately," when used to modify another term, mean "for the most part" or "being largely but not wholly or completely that which is specified" by the modified term.

It should also be appreciated from the foregoing description that, except when mutually exclusive, the features of the various embodiments described herein may be combined with features of other embodiments as desired while remaining within the intended scope of the disclosure.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated.

With respect to the above description then, it is to be realized that the optimum dimensional relationships for the parts of the disclosed embodiments and implementations, to include variations in size, materials, shape, form, function and manner of operation, assembly and use, are deemed readily apparent and obvious to one skilled in the art in light of the foregoing disclosure, and all equivalent relationships to those illustrated in the drawings and described in the specification are intended to be encompassed by the present disclosure.

Therefore, the foregoing is considered as illustrative only of the principles of the disclosure. Further, since numerous modifications and changes will readily occur to those skilled in the art, it is not desired to limit the disclosed subject matter to the exact construction and operation shown and described, and accordingly, all suitable modifications and equivalents may be resorted to that fall within the scope of the claims.

I claim:

1. A bale processing apparatus comprising:
   a frame;
   a bale hopper defining a bale chamber for receiving a bale to be processed, the bale hopper having an upper opening into the bale chamber and a chamber bottom positioned opposite of the upper opening, the bale hopper defining a bale feed opening;
   a bale shredding assembly including a shredding rotor rotatable in a rotor chamber, the shredding rotor being configured to engage a bale in the bale chamber through the bale feed opening;
   a bale movement assembly configured to move a bale in the bale chamber toward the bale feed opening and the shredding rotor; and
   a bale lift assembly for lifting a bale into the bale chamber, the bale lift assembly having a lowered position and a raised position with respect to the ground surface, the bale lift assembly comprising:
      a lift frame pivotally mounted on the frame such that the lift frame moves upwardly with respect to the frame from the lowered position to the raised position, the lift frame having a top and a bottom in the lowered position of the bale lift assembly, the bottom of the lift frame being moved to a vertical level higher than the top of the lift frame in the raised position of the bale lift assembly; and
      a bale spear having:
         a spearing position configured to facilitate spearing of a bale when the lift assembly is in the lowered position; and
         a release position having a tip of the bale spear lowered above the bale hopper to permit a bale impaled on the spear to fall from the spear into the bale chamber;
         wherein the bale spear is mounted on the lift frame to pivot with respect to the lift frame toward the top of the lift frame when the spear moves from the spearing position to the release position as the bale lift assembly moves from the lowered position to the raised position.

2. The bale processing apparatus of claim 1 wherein the bale lift assembly further comprises a pair of forks mounted on the lift frame to lift a bale from the ground surface into the bale chamber.

3. The bale processing apparatus of claim 2 wherein the pair of forks and the bale spear are each individually removably mounted on the lift frame such that the pair of forks and the bale spear are usable individually on the lift frame.

4. The bale processing apparatus of claim 1 wherein the bale spear has a base end pivotally mounted on the lift frame, and movement of the bale spear from the spearing position to the release position causes the tip of the bale spear to be positioned vertically lower than the base end of the bale spear to facilitate falling of the bale from the spear in the raised position of the bale lift assembly.

5. The bale processing apparatus of claim 1 wherein the lift frame has a top and a bottom when the bale lift assembly is in the lowered position; and
   wherein the bale spear pivots toward the top of the lift frame when the bale spear moves from the spearing position toward the release position.

6. The bale processing apparatus of claim 1 wherein in the spearing position, the bale spear is oriented substantially perpendicular to the lift frame and
   in the release position, the bale spear is oriented substantially parallel to the lift frame.

7. The bale processing apparatus of claim 1 wherein the bale lift assembly includes a pivot mount pivotally mounting the lift frame on the frame to permit rotation of the lift frame about a substantially horizontal axis with respect to the frame.

8. The bale processing apparatus of claim 1 wherein the bale spear is mounted on the lift frame in a manner permitting the bale spear to pivot with respect to the lift frame about a substantially horizontal axis.

9. The bale processing apparatus of claim 1 wherein the bale lift assembly includes a pivot mount pivotally mounting the lift frame on the frame such that the lift frame is pivotable from a location adjacent to the frame in the lowered position of the bale lift assembly to a location extending upwardly from the frame in the raised position of the bale lift assembly.

10. The bale processing apparatus of claim 1 additionally comprising a rotor operating assembly mounted on the frame and configured to rotate the shredding rotor, the rotator operating assembly comprising an engine fully mounted on the frame such that the frame and the engine may be removed as a unit from a loader when the loader is utilized to support the apparatus.

11. The bale processing apparatus of claim 10 wherein the rotor operating assembly is configured to rotate the shredding rotor independent of any power source not mounted on the frame.

12. The bale processing apparatus of claim 1 wherein the bale hopper includes a perimeter including a front wall, a rear wall positioned in opposition to the front wall, a side wall extending between the front and rear walls, and a side gate positioned in opposition to the side wall; and
   wherein a bale holding capacity of the bale chamber is expandable by movement of the side gate from a retracted position to and extended position.

13. The bale processing apparatus of claim 12 wherein the side gate is pivotable with respect to the frame about a substantially horizontal axis.

14. The bale processing apparatus of claim 1 wherein the bale movement assembly includes a plurality of bale rollers configured to rotate a bale positioned in the bale chamber, all of the bale rollers being positioned to one side of the shredding rotor.

15. The bale processing apparatus of claim 14 wherein all of the bale rollers are located between the shredding rotor and a side gate forming a portion of a perimeter of the bale hopper.

16. The bale processing apparatus of claim 1 wherein the shredding rotor of the bale shredding assembly includes a rotor shaft rotatably mounted on the frame, a plurality of flails mounted on the rotor shaft, and a plurality of hammers mounted on the rotor shaft.

17. A bale processing apparatus comprising:
a frame;
a bale hopper defining a bale chamber for receiving a bale to be processed, the bale hopper having an upper opening into the bale chamber and a chamber bottom positioned opposite of the upper opening, the bale hopper defining a bale feed opening;
a bale shredding assembly including a shredding rotor rotatable in a rotor chamber, the shredding rotor being configured to engage a bale in the bale chamber through the bale feed opening;
a bale movement assembly configured to move a bale in the bale chamber toward the bale feed opening and the shredding rotor; and
a bale lift assembly for lifting a bale into the bale chamber, the bale lift assembly having a lowered position and a raised position with respect to the ground surface;
wherein the bale lift assembly comprises a lift frame and a bale spear, the bale spear having a base end and a tip end, the base end being movably mounted on the lift frame to move between:
   a spearing position configured to facilitate spearing of a bale when the lift assembly is in the lowered position; and
   a release position having a portion of the bale spear being positioned over the bale hopper with the tip end of the bale spear being lowered toward the upper opening of the bale hopper to permit a bale impaled on the spear to fall from the spear into the bale chamber;
wherein the frame includes at least one mount structure configured to mount on support arms of a loader such that the bale spear of the bale lift assembly is raisable and lowerable with respect to the ground surface by the support arms of the loader to permit the bale spear in the spearing position to be raised with respect to the ground surface to engage a bale stacked on another bale in a stack of bales.

\* \* \* \* \*